US010461797B2

(12) United States Patent
Liu et al.

(10) Patent No.: US 10,461,797 B2
(45) Date of Patent: *Oct. 29, 2019

(54) NARROWBAND COMMUNICATION FOR DIFFERENT DEVICE CAPABILITIES IN UNLICENSED SPECTRUM

(71) Applicant: QUALCOMM Incorporated, San Diego, CA (US)

(72) Inventors: Chih-Hao Liu, San Diego, CA (US); Srinivas Yerramalli, San Diego, CA (US); Chirag Patel, San Diego, CA (US); Tamer Kadous, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,969

(22) Filed: Jan. 8, 2019

(65) Prior Publication Data
US 2019/0149185 A1    May 16, 2019

Related U.S. Application Data

(63) Continuation of application No. 15/637,178, filed on Jun. 29, 2017, now Pat. No. 10,218,406.
(Continued)

(51) Int. Cl.
*H04B 1/00* (2006.01)
*H04B 1/403* (2015.01)
(Continued)

(52) U.S. Cl.
CPC ............. *H04B 1/406* (2013.01); *H04B 1/005* (2013.01); *H04B 1/006* (2013.01); *H04B 1/0057* (2013.01);
(Continued)

(58) Field of Classification Search
CPC .......... H04B 1/005; H04B 1/707; H04B 1/26; H04B 1/006; H04B 1/0057; H04B 7/2634;
(Continued)

(56) References Cited

U.S. PATENT DOCUMENTS

2015/0043520 A1* 2/2015 Sun .................. H04L 5/001
370/330
2016/0330678 A1 11/2016 Yoon et al.
(Continued)

OTHER PUBLICATIONS

Itri., et al., "Resource Allocation and Channel Access for PUSCH," 3GPP Draft; R1-162985, 3rd Generation Partnership Project (3GPP), Mobile Competence Centre; 650, Route Des Lucioles; F-06921 Sophia-Antipolis Cedex; France; vol. RAN WG1, No. Busan, Korea; 20160411-20160415; Apr. 1, 2016 (Apr. 1, 2016), 4 Pages, XP051079747, Retrieved from the Internet: URL:http://www.3gpp.org/ftp/tsg_ran/WG1_RL1/TSGR1_84b/Docs/, [retrieved on Apr. 1, 2016].
(Continued)

*Primary Examiner* — Syed Haider
(74) *Attorney, Agent, or Firm* — Holland & Hart LLP

(57) ABSTRACT

Methods, systems, and devices for wireless communication are described. Resources for narrowband communication in an unlicensed radio frequency spectrum band may be configured and allocated based on resource availability, regulatory constraints, and device capability or category. A narrowband wireless device, such as a machine type communication device or other relatively low complexity device, may communicate using one or more narrowband carriers, which may occupy between one tone and multiple resource blocks in an unlicensed spectrum band (e.g., any number of resources between one (1) tone and multiple resource blocks (RBs)). Different device types may thus be configured differently as they move between geographic
(Continued)

regions. The base station may then communicate with the narrowband mobile device based on the resource allocation and the carrier configuration.

60 Claims, 16 Drawing Sheets

Related U.S. Application Data

(60) Provisional application No. 62/383,359, filed on Sep. 2, 2016.

(51) Int. Cl.

| | | |
|---|---|---|
| *H04B 1/26* | (2006.01) | |
| *H04B 1/707* | (2011.01) | |
| *H04B 7/24* | (2006.01) | |
| *H04B 7/26* | (2006.01) | |
| *H04L 5/00* | (2006.01) | |
| *H04L 27/00* | (2006.01) | |
| *H04W 16/14* | (2009.01) | |
| *H04W 72/04* | (2009.01) | |

(52) U.S. Cl.
CPC ............... *H04B 1/26* (2013.01); *H04B 1/707* (2013.01); *H04B 7/24* (2013.01); *H04B 7/2634* (2013.01); *H04L 5/001* (2013.01); *H04L 5/0044* (2013.01); *H04L 5/0064* (2013.01); *H04L 5/0069* (2013.01); *H04L 5/0091* (2013.01); *H04L 27/0006* (2013.01); *H04W 16/14* (2013.01); *H04W 72/044* (2013.01); *H04W 72/0406* (2013.01); *H04W 72/048* (2013.01)

(58) Field of Classification Search
CPC ........... H04B 7/24; H04B 1/406; H04L 5/001; H04L 5/0044; H04L 5/0064; H04L 5/0091; H04L 27/0006; H04L 5/0069; H04W 16/14; H04W 72/0406; H04W 72/044; H04W 72/048
See application file for complete search history.

(56) References Cited

U.S. PATENT DOCUMENTS

| | | | |
|---|---|---|---|
| 2016/0353481 A1* | 12/2016 | Wei | ................. H04W 74/0808 |
| 2017/0099678 A1* | 4/2017 | Dinan | ............... H04W 74/0808 |
| 2017/0325283 A1 | 11/2017 | Wu | |
| 2018/0069589 A1 | 3/2018 | Liu et al. | |

OTHER PUBLICATIONS

International Search Report and Written Opinion—PCT/US2017/040384—ISA/EPO—dated Oct. 23, 2017.
Nokia Networks., et al., "NB-IoT Operation in Multiple PRBs", 3GPP Draft, R1-160447, 3rd Generation Partnership Project (3GPP), Mobile Competence Centre, 650, Route Des Lucioles, F-06921 Sophia-Antipolis Cedex, France, vol. RAN WG1, No. St Julian's, Malta, 20160215-20160219, Feb. 5, 2016 (Feb. 5, 2016), XP051063773, Retrieved from the Internet: URL: http://www.3gpp.org/ftp/tsg_ran/WG1_RL1/TSGR1_84/Docs/ [retrieved on Feb. 5, 2016].

\* cited by examiner

NARROWBAND COMMUNICATION FOR DIFFERENT DEVICE CAPABILITIES IN UNLICENSED SPECTRUM

CROSS REFERENCES

The present Application for Patent is a Continuation of U.S. patent application Ser. No. 15/637,178 by Liu, et al, entitled "Narrowband Communication for different Device Capabilities In Unlicensed Spectrum" filed Jun. 29, 2017, which claims priority to U.S. Provisional Patent Application No. 62/383,359 by Liu, et al., entitled "Narrowband Communication For Different Device Capabilities in Unlicensed Spectrum," filed Sep. 2, 2016, assigned to the assignee hereof.

BACKGROUND

The following relates generally to wireless communication and more specifically to narrowband communication for different device capabilities in unlicensed spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communications systems may support communication between base stations and different types of narrowband device types. For example, in enhanced machine-type communications (eMTC) and narrowband-Internet of Things (NB-IoT) deployments, mobile devices may communicate with a base station (or other serving station) using resources allocated specifically for one deployment or the other. Such systems may not be configured to account for differences in resource capability or bandwidth availability.

Some wireless systems support narrowband communication configurations such as NB-IoT and eMTC in unlicensed radio frequency spectrum. However, resource availability or regulatory restrictions for communication in an unlicensed spectrum may impose limitations that impact narrowband communications. These limitations may reduce the efficiency of narrowband communications and may not account for varying capabilities of narrowband devices within the system.

SUMMARY

A wireless device (e.g., a narrowband wireless device) may be configured to communicate with a base station using one or more narrowband carriers in an unlicensed spectrum radio frequency spectrum band. The number of carriers employed may depend on the geographic region of operation and the capability or category of the device. Such flexibility in resource allocation may allow a base station to communicate with devices of different capabilities, which may move between jurisdictions having various resource availability and regulatory restrictions for unlicensed spectrum resources. The wireless device may communicate with the base station based on the resource allocation and the carrier configuration. In some cases, uplink and downlink messages may be formatted based on the resource allocation and the carrier configuration.

A method of wireless communication is described. The method may include receiving a configuration message on resources of a first carrier in a first narrowband region of an unlicensed radio frequency spectrum band, identifying, based at least in part on the configuration message, a configuration of one or more additional carriers that are each in a different narrowband region of the unlicensed radio frequency spectrum band, receiving, on resources of the first carrier, an assignment of resources on the one or more additional carriers in the different narrowband regions of the unlicensed radio frequency spectrum band, and communicating on the one or more additional carriers in the different narrowband regions of the unlicensed radio frequency spectrum band according to the assignment.

An apparatus for wireless communication is described. The apparatus may include means for receiving a configuration message on resources of a first carrier in a first narrowband region of an unlicensed radio frequency spectrum band, means for identifying, based at least in part on the configuration message, a configuration of one or more additional carriers that are each in a different narrowband region of the unlicensed radio frequency spectrum band, means for receiving, on resources of the first carrier, an assignment of resources on the one or more additional carriers in the different narrowband regions of the unlicensed radio frequency spectrum band, and means for communicating on the one or more additional carriers in the different narrowband regions of the unlicensed radio frequency spectrum band according to the assignment.

Another apparatus for wireless communication is described. The apparatus may include a processor, memory in electronic communication with the processor, and instructions stored in the memory. The instructions may be operable to cause the processor to receive a configuration message on resources of a first carrier in a first narrowband region of an unlicensed radio frequency spectrum band, identify, based at least in part on the configuration message, a configuration of one or more additional carriers that are each in a different narrowband region of the unlicensed radio frequency spectrum band, receive, on resources of the first carrier, an assignment of resources on the one or more additional carriers in the different narrowband regions of the unlicensed radio frequency spectrum band, and communicate on the one or more additional carriers in the different narrowband regions of the unlicensed radio frequency spectrum band according to the assignment.

A non-transitory computer readable medium for wireless communication is described. The non-transitory computer-readable medium may include instructions operable to cause a processor to receive a configuration message on resources of a first carrier in a first narrowband region of an unlicensed radio frequency spectrum band, identify, based at least in part on the configuration message, a configuration of one or more additional carriers that are each in a different narrowband region of the unlicensed radio frequency spectrum band, receive, on resources of the first carrier, an assignment of resources on the one or more additional carriers in the different narrowband regions of the unlicensed radio frequency spectrum band, and communicate on the one or more additional carriers in the different narrowband regions of the unlicensed radio frequency spectrum band according to the assignment.

In some examples of the method, apparatus, and non-transitory computer-readable medium described above, the one or more additional carriers may be contiguous to one another. Some examples of the method, apparatus, and non-transitory computer-readable medium described above may further include processes, features, means, or instructions for transmitting an uplink message on resources of the first carrier in the first narrowband region. Some examples of the method, apparatus, and non-transitory computer-readable medium described above may further include processes, features, means, or instructions for transmitting an indication of a capability or category of a wireless device on resources of the first carrier, where the configuration of the one or more additional carriers may be based at least in part on the capability or category of the wireless device.

In some examples of the method, apparatus, and non-transitory computer-readable medium described above, a number of the one or more additional carriers in the configuration may be based at least in part on the capability or category of the wireless device. In some examples of the method, apparatus, and non-transitory computer-readable medium described above, receiving the assignment of resources includes receiving a downlink control message having a format that may be based at least in part on the capability or category of the wireless device.

In some examples of the method, apparatus, and non-transitory computer-readable medium described above, communicating on the one or more additional carriers includes receiving a downlink data message on the resources of the one or more additional carriers, where a format of the downlink data message may be based at least in part on the capability or category of the wireless device. Some examples of the method, apparatus, and non-transitory computer-readable medium described above may further include processes, features, means, or instructions for transmitting an uplink control message on resources of the first carrier, where a format of the uplink control message may be based at least in part on the capability or category of the wireless device.

In some examples of the method, apparatus, and non-transitory computer-readable medium described above, communicating on the one or more additional carriers includes transmitting an uplink control message or an uplink data message on the resources of the one or more additional carriers, where a format of the uplink control message or the uplink data message may be based at least in part on the capability or category of the wireless device. In some examples of the method, apparatus, and non-transitory computer-readable medium described above, a bandwidth of each narrowband region includes a bandwidth of twelve Long Term Evolution (LTE) subcarriers (1RB).

Some examples of the method, apparatus, and non-transitory computer-readable medium described above may further include processes, features, means, or instructions for receiving a system information broadcast message on resources of the first carrier. Some examples of the method, apparatus, and non-transitory computer-readable medium described above may further include processes, features, means, or instructions for identifying the different narrowband regions of the unlicensed radio frequency spectrum band based at least in part on the system information broadcast message. Some examples of the method, apparatus, and non-transitory computer-readable medium described above may further include processes, features, means, or instructions for performing a random access procedure using resources of the first carrier, where the configuration message may be received during the random access procedure.

Some examples of the method, apparatus, and non-transitory computer-readable medium described above may further include processes, features, means, or instructions for receiving one or more synchronization signals on resources of the first carrier. Some examples of the method, apparatus, and non-transitory computer-readable medium described above may further include processes, features, means, or instructions for identifying a location of the first narrowband region of the unlicensed radio frequency spectrum band based at least in part on the one or more synchronization signals.

Some examples of the method, apparatus, and non-transitory computer-readable medium described above may further include processes, features, means, or instructions for determining that a base station may have gained access to the first narrowband region and the different narrowband regions of the unlicensed radio frequency spectrum band based at least in part on receiving the one or more synchronization signals. Some examples of the method, apparatus, and non-transitory computer-readable medium described above may further include processes, features, means, or instructions for tuning one or more radio frequency (RF) chains to frequencies of the different narrowband regions based at least in part on determining that the base station gained access to the first narrowband region and the different narrowband regions.

Some examples of the method, apparatus, and non-transitory computer-readable medium described above may further include processes, features, means, or instructions for monitoring for the one or more synchronization signals while operating in a radio resource control (RRC) idle mode. In some examples of the method, apparatus, and non-transitory computer-readable medium described above, the one or more synchronization signals include a primary synchronization signal (PSS) and a secondary synchronization signal (SSS).

A method of wireless communication is described. The method may include transmitting a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band, transmitting, on resources of the first carrier to the first wireless device, an assignment of resources on the first set of additional carriers in the different narrowband regions of the unlicensed radio frequency spectrum band, and communicating with the first wireless device on the first set of additional carriers in the different narrowband regions of the unlicensed radio frequency spectrum band according to the assignment.

An apparatus for wireless communication is described. The apparatus may include means for transmitting a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band, means for transmitting, on resources of the first carrier to the first wireless device, an assignment of resources on the first set of additional carriers in the different narrowband regions of the unlicensed radio frequency spectrum band, and means for communicating with the first wireless device on the first set of additional carriers in the different narrowband regions of the unlicensed radio frequency spectrum band according to the assignment.

Another apparatus for wireless communication is described. The apparatus may include a processor, memory in electronic communication with the processor, and instructions stored in the memory. The instructions may be operable to cause the processor to transmit a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band, transmit, on resources of the first carrier to the first wireless device, an assignment of resources on the first set of additional carriers in the different narrowband regions of the unlicensed radio frequency spectrum band, and communicate with the first wireless device on the first set of additional carriers in the different narrowband regions of the unlicensed radio frequency spectrum band according to the assignment.

A non-transitory computer readable medium for wireless communication is described. The non-transitory computer-readable medium may include instructions operable to cause a processor to transmit a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band, transmit, on resources of the first carrier to the first wireless device, an assignment of resources on the first set of additional carriers in the different narrowband regions of the unlicensed radio frequency spectrum band, and communicate with the first wireless device on the first set of additional carriers in the different narrowband regions of the unlicensed radio frequency spectrum band according to the assignment.

Some examples of the method, apparatus, and non-transitory computer-readable medium described above may further include processes, features, means, or instructions for transmitting an additional configuration message on the first carrier in the first narrowband region of the unlicensed radio frequency spectrum band to a second wireless device, where the additional configuration message identifies a configuration of a second set of additional carriers that may be each different narrowband regions.

In some examples of the method, apparatus, and non-transitory computer-readable medium described above, each carrier of the first set of additional carriers may be contiguous to another carrier of the first set of additional carriers. Some examples of the method, apparatus, and non-transitory computer-readable medium described above may further include processes, features, means, or instructions for receiving an uplink message from the first wireless device on resources of the first carrier in the first narrowband region.

Some examples of the method, apparatus, and non-transitory computer-readable medium described above may further include processes, features, means, or instructions for receiving an indication of a capability or category of the first wireless device on resources of the first carrier, where the configuration of the first set of additional carriers may be based at least in part on the capability or category of the first wireless device. In some examples of the method, apparatus, and non-transitory computer-readable medium described above, a number of carriers in the first set of additional carriers in the configuration may be based at least in part on the capability or category of the first wireless device.

In some examples of the method, apparatus, and non-transitory computer-readable medium described above, transmitting the assignment of resources includes transmitting a downlink control message having a format that may be based at least in part on the capability or category of the first wireless device. In some examples of the method, apparatus, and non-transitory computer-readable medium described above, communicating on the first set of additional carriers includes transmitting a downlink data message on the resources of the first set of additional carriers, where a format of the downlink data message may be based at least in part on the capability or category of the first wireless device.

Some examples of the method, apparatus, and non-transitory computer-readable medium described above may further include processes, features, means, or instructions for receiving an uplink control message on resources of the first carrier, where a format of the uplink control message may be based at least in part on the capability or category of the first wireless device. In some examples of the method, apparatus, and non-transitory computer-readable medium described above, communicating on the first set of additional carriers includes receiving an uplink control message or an uplink data message on the resources of the first set of additional carriers, where a format of the uplink control message or the uplink data message may be based at least in part on the capability or category of the first wireless device.

Some examples of the method, apparatus, and non-transitory computer-readable medium described above may further include processes, features, means, or instructions for transmitting a system information broadcast message on resources of the first carrier, where the system information broadcast message identifies the different narrowband regions of the unlicensed radio frequency spectrum band. Some examples of the method, apparatus, and non-transitory computer-readable medium described above may further include processes, features, means, or instructions for performing a random access procedure with the first wireless device using resources of the first carrier, where the configuration message may be transmitted during the random access procedure. Some examples of the method, apparatus, and non-transitory computer-readable medium described above may further include processes, features, means, or instructions for transmitting one or more synchronization signals on resources of the first carrier.

DETAILED DESCRIPTION

Figure 1:
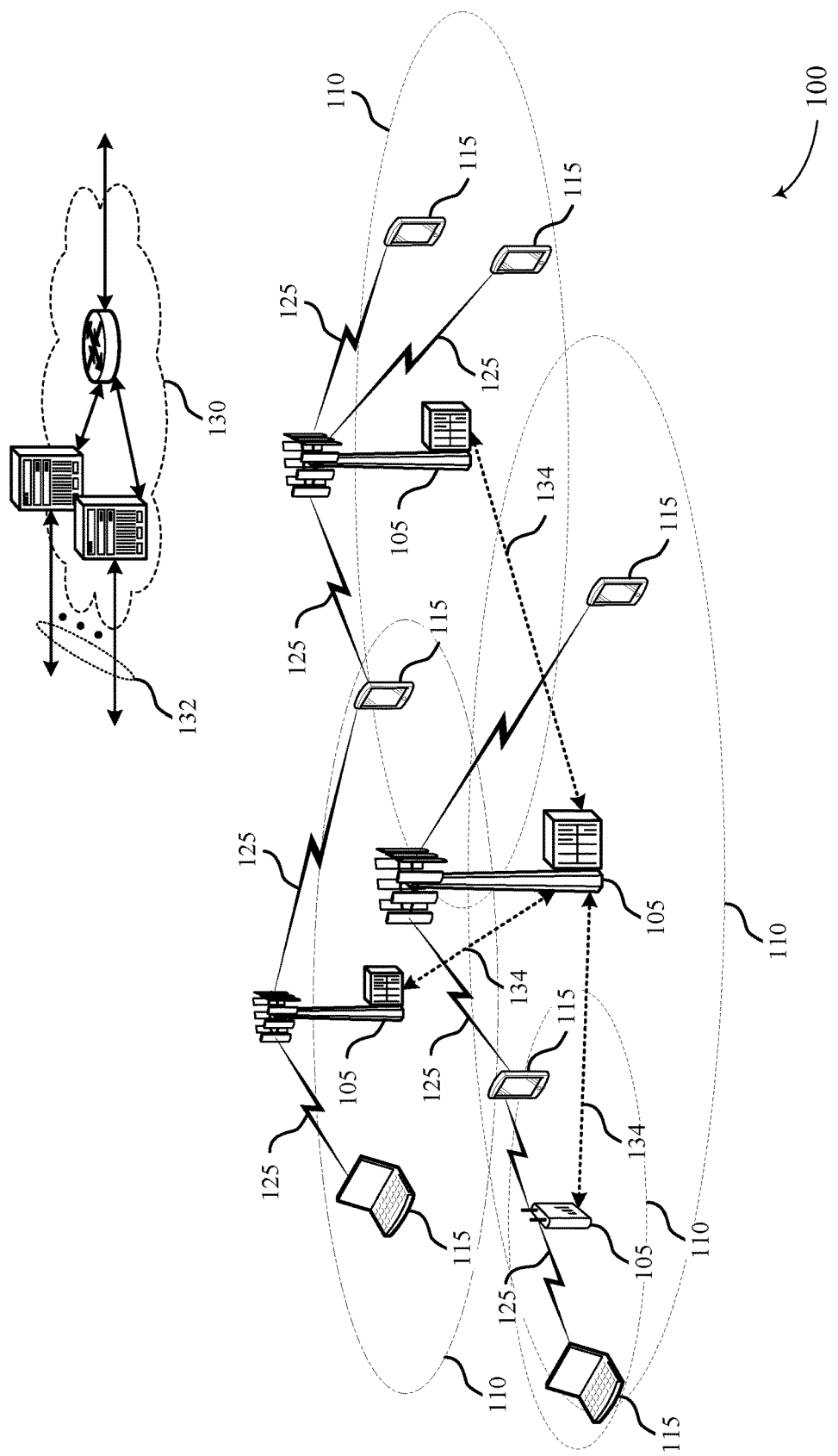
FIG. 1 illustrates an example of a wireless communications system that supports narrowband communication for different device capabilities in unlicensed spectrum in accordance with aspects of the present disclosure.

Resources for narrowband communication in an unlicensed radio frequency spectrum band may be configured and allocated based on resource availability, regulatory constraints, device capability or category, etc. Machine type communication (MTC) devices or other relatively low complexity devices, including those associated with the Internet of Things (IoT), may communicate using one or more narrowband carriers, which may occupy between one tone and multiple resource blocks in an unlicensed spectrum band. In some cases, different countries may have different amounts of bandwidth available in unlicensed spectra. Different device types may thus be configured differently as they move between geographic regions.

By way of example, MTC (or enhanced MTC (eMTC)) and IoT devices may transmit a relatively low amount of data periodically (or when requested) rather than continuously exchanging information with a base station (or other serving station). Such devices may include meters (e.g., water meter, gas meter), sensors (e.g., smoke detector, light sensor), or wearable technology (e.g., smart watches), which may have limited battery life or may be located at the edges of cell coverage areas. Instead of operating using a traditional deployment designed for high data rates or continuous communication (e.g., Long Term Evolution (LTE)/LTE-Advanced (LTE-A)), these devices may communicate using deployments designed to reduce the complexity of devices, increase coverage, and provide better battery life.

Further, eMTC and narrowband IoT (NB-IoT) devices may communicate in an unlicensed frequency spectrum band when resources in a licensed spectrum are unavailable (e.g., due to increased data traffic, high usage fees, etc.). Either eMTC or NB-IoT techniques may be supported by a base station and used by devices communicating at relatively low data rates or in low signal to noise ratio (SNR) environments.

While eMTC deployments may offer some advantages over NB-IoT deployments in certain scenarios (e.g., resource flexibility, channel quality feedback, and frequency diversity), cell acquisition may take two to three times longer in an eMTC deployment than in an NB-IoT deployment. Depending on a geographic region of operation, the resource flexibility of an eMTC deployment may allow a device to satisfy, for example, bandwidth requirements (e.g., for a given application). As for NB-IoT deployments, faster cell acquisition procedures of these deployments may allow more efficient (e.g., energy efficient) use of resources in an unlicensed frequency spectrum band. Accordingly, it may be appropriate to provide improved system performance to support narrowband techniques that facilitate flexible deployment operation (e.g., eMTC and NB-IoT deployments) in multiple geographic regions that, in some cases, may be associated with varying available spectrum or bandwidth.

As described herein, a wireless communications system may support efficient narrowband techniques for facilitating flexible deployment operation. In some examples, a narrowband wireless device may receive a configuration on a first carrier for communication on additional carriers of an unlicensed spectrum band. The narrowband wireless device may then receive an assignment of resources to use for communication on the additional carriers. Based on the resource assignment and the configuration of the multiple carriers, the narrowband wireless device may communicate with a base station in the unlicensed spectrum using the additional carriers. These techniques for narrowband communication in an unlicensed spectrum may allow for efficient use of an unlicensed spectrum in different geographic regions.

Aspects of the disclosure introduced above are described below in the context of a wireless communications system. Examples of processes and signaling exchanges that support narrowband communication for different device capabilities in an unlicensed spectrum are then described. Aspects of the disclosure are further illustrated by and described with reference to apparatus diagrams, system diagrams, and flowcharts that relate to narrowband communication for different device capabilities in an unlicensed spectrum.

FIG. 1 illustrates an example of a wireless communications system 100 in accordance with various aspects of the present disclosure. The wireless communications system 100 includes base stations 105, user equipment (UE)s 115, and a core network 130. In some examples, the wireless communications system 100 may be an LTE (or LTE-A) network. In some implementations, the wireless communications system 100 may support communication between base stations 105 and UEs 115 with different capabilities.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile.

A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 115 may be capable of narrowband communication, and may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an IoT device, an Internet of Everything (IoE) device, an MTC device, an appliance, an automobile, or the like. Some UEs 115 may be wearable devices, such as personal biometric or fitness monitors, location tracking devices, sensors, monitors, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a physical downlink control channel (PDCCH) may carry downlink control information (DCI) in at least one control channel element (CCE), which may consist of nine logically contiguous resource element groups (REGs), where each REG contains four (4) resource elements. DCI includes information regarding downlink scheduling assignments, uplink resource grants, transmission scheme, uplink power control, hybrid automatic repeat request (HARD) information, modulation and coding scheme (MCS), etc.

The size and format of the DCI messages can differ depending on the type and amount of information that is carried by the DCI. For example, if spatial multiplexing is supported, the size of the DCI message may be large compared to contiguous frequency allocations. Similarly, for a system that employs multiple-input multiple-output (MIMO), the DCI may include additional signaling information. DCI size and format may depend on the amount of information as well as factors such as bandwidth, the number of antenna ports, and duplexing mode. PDCCH can carry DCI messages associated with multiple users, and each UE 115 may decode the DCI messages that are intended for it. For example, each UE 115 may be assigned a cell radio network temporary identifier (C-RNTI) and each DCI may be scrambled based on the C-RNTI. Additionally, the size and format of the DCI messages, or the PDCCH carrying DCI, may depend on a capability or category of a device that is intended to receive the DCI or PDCCH. A PDCCH or other downlink control message may be configured for eMTC devices and NB-IoT devices, and the configuration of such messages may account for the relatively low complexity or low-power preference for eMTC and NB-IoT devices.

To reduce power consumption and overhead at the UE 115 (e.g., eMTC or NB-IoT device), a limited set of CCE locations can be specified for DCI associated with a specific UE 115. CCEs may be grouped (e.g., in groups of 1, 2, 4 and 8 CCEs), and a set of CCE locations in which UE 115 may find relevant DCI may be specified. These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures and the like. The UE-specific search space may be smaller for an eMTC device and smaller still for a NB-IoT device.

The UE-specific search space may include user-specific control information. CCEs may be indexed, and the common search space may start from CCE 0. The starting index for a UE specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt to descramble all potential DCI messages using its C-RNTI.

Data may be divided into logical channels, transport channels, and physical layer channels. Channels may also be classified into control channels and traffic channels. Logical control channels may include a paging control channel (PCCH) for paging information, a broadcast control channel (BCCH) for broadcast system control information, a multicast control channel (MCCH) for transmitting multimedia broadcast/multicast services (MBMS) scheduling and control information, a dedicated control channel (DCCH) for transmitting dedicated control information, a common control channel (CCCH) for random access information, a dedicated traffic channel (DTCH) for dedicated UE data, and an MBMS traffic channel (MTCH), for multicast data. Downlink transport channels may include a broadcast channel (BCH) for broadcast information, a downlink shared channel (DL-SCH) for data transfer, a paging channel (PCH) for paging information, and a multicast channel (MCH) for multicast transmissions. Uplink transport channels may include a random access channel (RACH) for access and an uplink shared channel (UL-SCH) for data.

Downlink physical channels may include a physical broadcast channel (PBCH) for broadcast information, a physical control format indicator channel (PCFICH) for control format information, a physical downlink control channel (PDCCH) for control and scheduling information, a physical HARQ indicator channel (PHICH) for HARQ status messages, a physical downlink shared channel (PDSCH) for user data and a physical multicast channel (PMCH) for multicast data. Uplink physical channels may include a physical random access channel (PRACH) for access messages, a physical uplink control channel (PUCCH) for control data, and a physical uplink shared channel (PUSCH) for user data. The downlink physical channels employed for communication for eMTC or NB-IoT communication may be tailored or configured for the low complexity, low-power preferences of such devices. For example, PDSCH or PUSCH, or both, may be configured with relatively small payloads, compared with PDSCH and PUSCH for more capable UEs 115 (e.g., UEs 115 with multiple radio frequency (RF) chains, capable of carrier aggregation, etc.).

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. The PSS and the SSS may be located in the central 62 and 72 subcarriers of a carrier, respectively. Alternatively, the location of PSS and SSS may depend on a particular application or deployment. For example, a system operating in an unlicensed radio frequency spectrum band may broadcast PSS or SSS at a location known to eMTC or NB-IoT devices, but the locations may span fewer subcarriers than LTE deployments and, as discussed below, may be transmitted on an anchor carrier.

After receiving the PSS and SSS, the UE 115 may receive a master information block (MIB), which may be transmitted in the PBCH or on a specific broadcast channel for narrowband devices, such as eMTC or NB-IoT devices. The MIB may contain system bandwidth information, single frequency network (SFN) information, and a PHICH configuration. The MIB may also contain system information that provides information about additional narrowband carriers, resource availability, regulatory constraints, or the like. Some or all of this additional information may also be included in other system information blocks (SIBs). After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain radio resource control (RRC) configuration information related to RACH procedures, paging, PUCCH, PUSCH, power control, sounding reference signals (SRSs), and cell barring.

In some cases, a base station 105 and a UE 115 may communicate using more than one carrier. Each aggregated carrier may be referred to as a component carrier (CC). Each CC can have a bandwidth of, e.g., 1.4, 3, 5, 10, 15 or 20 MHz. But aggregation of such carriers may be unhelpful or not applicable in the eMTC and NB-IoT context. For example, carrier aggregation may be designed to facilitate large bandwidths in the downlink, while eMTC and NB-IoT may be principally concerned with asymmetric uplink communications. Additionally, eMTC and NB-IoT may operate in bands significantly narrower than a single CC. As discussed below, some eMTC and NB-IoT devices may communicate on multiple narrowband carriers, and this communication may support degrees of narrowband operation and may thus be distinct from the wide bandwidths facilitated by carrier aggregation. Likewise, in eMTC and NB-IoT, uplink control information may be transmitted on one or multiple narrowband carriers, rather than a single designated primary cell. Additionally, each narrowband carrier that supports eMTC or NB-IoT may not be associated with a different cell but may be different frequencies of a cell of one base station 105 or access point operating in an unlicensed radio frequency spectrum band.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology in an unlicensed band, such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. Operations in an unlicensed spectrum may include downlink transmissions, uplink transmissions, or both. Duplexing in an unlicensed spectrum may be based on frequency division duplexing (FDD), TDD, or a combination of both.

Devices operating in a shared or unlicensed frequency spectrum may perform an LBT procedure such as a clear channel assessment (CCA) prior to communicating in order to determine whether the channel is available. A CCA may include an energy detection procedure to determine whether there are any other active transmissions. For example, the device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

As mentioned, some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power-saving "deep sleep" mode when not engaging in active communications.

An eMTC device may also operate using half-duplex communications at a reduced peak rate. eMTC devices may also be configured to enter a power-saving "deep sleep" mode when not engaging in active communications. An eMTC deployment may provide resource flexibility and may use some channels associated with an LTE/LTE-A system and other channels in an unlicensed spectrum. In some examples, eMTC devices may communicate over a scalable bandwidth (e.g., between one (1) resource block (RB) and six (6) RBs), and eMTC devices may have a maximum data rate of one (1) Mbps. eMTC devices may be power limited and may support features that limit power usage. However, an acquisition procedure for the transition of an eMTC device from an idle mode to a connected mode may be power consuming. Additionally or alternatively, an eMTC device may be designed for operation in an in-band deployment mode. For a standalone deployment mode (e.g., in an unlicensed spectrum), the physical (PHY), media access control (MAC), and upper layer procedures at the eMTC device may be cumbersome.

NB-IoT devices may be a subset of eMTC devices or low power devices that support a higher maximum coupling loss (MCL) and may include synchronization channels that support power boosting for faster cell acquisition and search. These features allow for increased efficiency for operation of NB-IoT devices in a standalone deployment mode (e.g., in an unlicensed spectrum) when compared to eMTC devices. Additionally, an acquisition procedure for the transition of an NB-IoT device from an idle mode to a connected mode may not be as power consuming as the same procedure for an eMTC device. However, NB-IoT devices may not support communication over a scalable bandwidth. Instead, NB-IoT devices may communicate using a range of resources between one (1) tone and one (1) RB with a maximum data rate of 66 kbps for uplink communication. In some cases, this range of resources may not conform to the minimum bandwidth requirement for operation in an unlicensed spectrum (e.g., depending on a geographic region). Additionally, this range of resources may not allow a device to transmit with the minimum power for transmission in an unlicensed spectrum. Therefore, wireless communications system 100 may be modified to support features of both NB-IoT deployments and eMTC deployments.

Accordingly, wireless communications system 100 may support communication over scalable bandwidths for a single network of devices with different capabilities. A base station 105 may configure UE 115 for communication on multiple carriers based on the capability or a category of the UE 115. The base station 105 may then allocate resources for communication with UE 115 based on the configuration. The resource allocation may be for communication on a single carrier or multiple carriers of an unlicensed spectrum. Each carrier may be associated with a different narrowband region of the unlicensed spectrum. After receiving the resource allocation (or assignment of resources) UE 115 may communicate with base station 105 using the allocated resources. Base station 105 may format control and data signals for transmissions to UE 115 (or vice versa) based on the allocation of resources and the capabilities of the UE 115.

Figure 2:
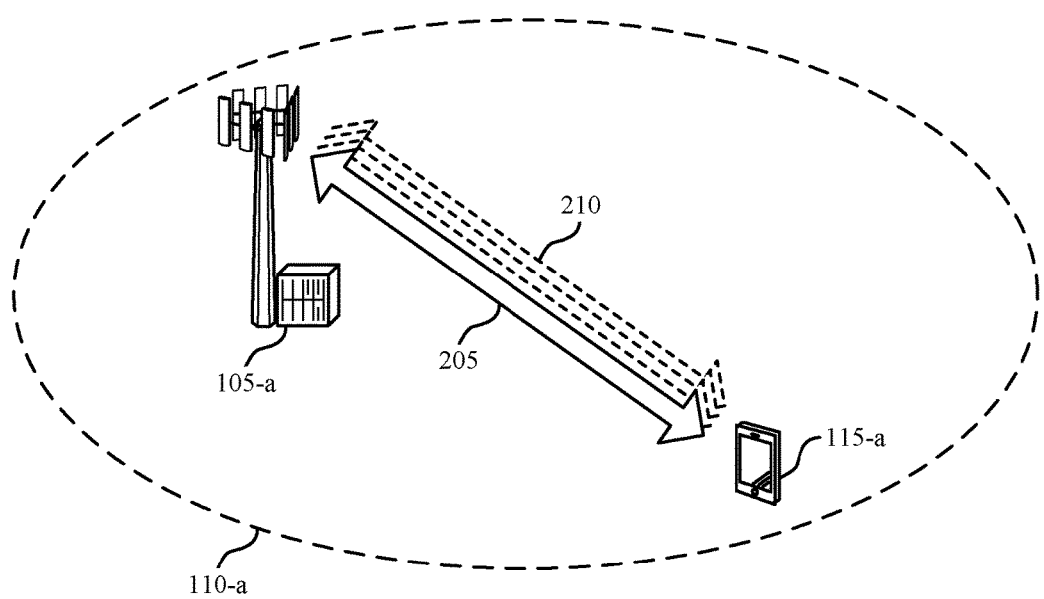
FIG. 2 illustrates an example of a wireless communications system that supports narrowband communication for different device capabilities in unlicensed spectrum in accordance with aspects of the present disclosure.
Figure 2:

FIG. 2 shows a diagram of a wireless communications system 200 illustrating an example of narrowband communication for different device capabilities in an unlicensed spectrum in accordance with various aspects of the present disclosure. Wireless communications system 200 may include base station 105-*a*, which may be an example of a base station 105 described with reference to FIG. 1. Wireless communications system 200 may also include UE 115-*a*, which may be an example of a UE 115 described with reference to FIG. 1. Base station 105-*a* may provide communication coverage for a respective coverage area 110-*a*, which may be an example of a coverage area 110 described with reference to FIG. 1. Base station 105-*a* may communicate with UE 115-*a* using an anchor carrier 205 and/or using non-anchor carriers 210. In some cases, each carrier of the non-anchor carriers 210 may be contiguous to another carrier of the non-anchor carriers 210.

Wireless communications system 200 may support techniques for narrowband communication in an unlicensed spectrum that allow for efficient use of the unlicensed spectrum in multiple geographic regions. In some examples, base station 105-*a* may perform an LBT procedure to gain access to anchor carrier 205. After gaining access to anchor carrier 205, base station 105-*a* may transmit a configuration message to UE 115-*a*. UE 115-*a* may monitor anchor carrier 205 for the configuration message and receive the configuration message from base station 105-*a*. The configuration message may identify a configuration of non-anchor carriers 210 for communication with base station 105-*a* in the unlicensed spectrum. In some cases, the configuration message may be included in RRC signaling when, for example, UE 115-*a* is in a connected mode. The anchor carrier 205 and non-anchor carriers 210 may each occupy a different narrowband region of the unlicensed spectrum.

In some cases, base station 105-*a* may transmit the configuration message along with synchronization signals (e.g., PSS and/or SSS) on anchor carrier 205. UE 115-*a* may monitor anchor carrier 205 and receive the synchronization signals from base station 105-*a*. UE 115-*a* may then identify the configuration message in the synchronization signal transmission. The anchor carrier may be used for communication with a specific UE (e.g., UE 115-*a*) or for communication with multiple UEs 115. In some cases, UE 115-*a* may be preconfigured to monitor anchor carrier 205 for the synchronization signals. By monitoring the single anchor carrier 205 instead of multiple carriers, UE 115-*a* may reduce power consumption. Additionally or alternatively, UE 115-*a* may perform a random access procedure (e.g., using a physical random access channel (PRACH)) to gain access to anchor carrier 205, and UE 115-*a* may receive the configuration message during the random access procedure.

After identifying the configuration indicated by the configuration message, UE 115-*a* may transition from an RRC-idle mode to an RRC-connected mode and begin monitoring multiple carriers (e.g., non-anchor carriers 210). UE 115-*a* may receive an allocation of resources (e.g., between one (1) tone and multiple RBs) from base station 105-*a* on non-anchor carriers 210 for communication with base station 105-*a*. The resource allocation may depend on the configuration and may include time-frequency resources of the anchor carrier 205 or non-anchor carriers 210. These techniques may support simultaneous transmissions on a configurable number of carriers and may support communication between base station 105-*a* and different device type deployments (e.g., eMTC or NB-IoT devices). Additionally, the flexible allocation of resources may support higher data rates for communication between base station 105-*a* and UE 115-*a* in an unlicensed spectrum.

In some examples, the resource allocation from base station 105-*a* may include resources allocated for downlink transmissions to UE 115-*a*. Base station 105-*a* may transmit control messages to UE 115-*a* via a control channel (e.g., narrowband physical downlink control channel (NPDCCH) or eMTC physical downlink control channel (MPDCCH)). Base station 105-*a* may format the control message transmission based on the resources allocated to UE 115-*a* (e.g., anchor carrier 205 and/or non-anchor carriers 210) and the capabilities of UE 115-*a*. In other examples, base station 105-*a* may transmit data to UE 115-*a* via a data channel (e.g., PDSCH). Base station 105-*a* may format the data transmission based on the resources allocated to UE 115-*a* (e.g., anchor carrier 205 and/or non-anchor carriers 210) and the capabilities of UE 115-*a*.

In other examples, the resource allocation from base station 105-*a* may include resources allocated for uplink transmissions from UE 115-*a*. In some examples, UE 115-*a* may transmit control messages to base station 105-*a* via a control channel (e.g., PUCCH). UE 115-*a* may format the control message transmission based on the resources allocated to UE 115-*a* (e.g., anchor carrier 205 and/or non-anchor carriers 210) and the capabilities of UE 115-*a*. In other examples, UE 115-*a* may transmit data to base station 105-*a* via a data channel (e.g., narrowband physical uplink shared channel (NPUSCH) or eMTC physical uplink shared channel (MPUSCH)). UE 115-*a* may format the data transmission based on the resources allocated to UE 115-*a* (e.g., anchor carrier 205 and/or non-anchor carriers 210) and the capabilities of UE 115-*a*.

Figure 3:
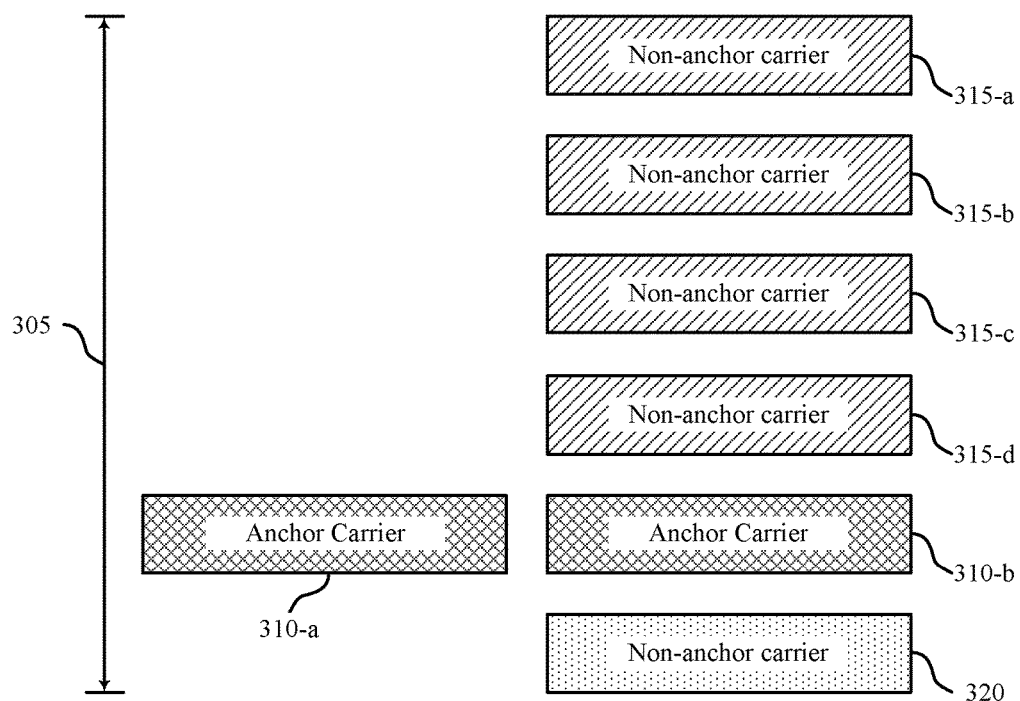
FIG. 3 illustrates an example of a carrier configuration for narrowband communication in an unlicensed spectrum for different device capabilities in accordance with aspects of the present disclosure.

FIG. 3 illustrates an example of a carrier configuration 300 for narrowband communication in an unlicensed spectrum for different device capabilities in accordance with aspects of the present disclosure. Carrier configuration 300 may include an anchor carrier 310, which may be an example of anchor carrier 205 described with reference to FIG. 2. Carrier configuration 300 may also include non-anchor carriers 315 and non-anchor carrier 320, which may be examples of non-anchor carriers 210 described with reference to FIG. 2.

With increasing data traffic in cellular networks, the offloading of at least some data traffic to an unlicensed radio frequency spectrum band 305 may provide a cellular operator with opportunities for enhanced data transmission capacity. In some cases, devices associated with a plurality of mobile network operators may compete with each other to access an unlicensed or shared licensed radio frequency. Therefore, once a base station 105 or UE 115 gains access to an unlicensed radio frequency spectrum band 305, it may be beneficial to support efficient use of the resources of the unlicensed radio frequency spectrum band 305.

A first UE 115 (not shown in FIG. 3, but which may be an example of a UE 115 depicted in FIG. 1, for example) may monitor a portion of or all of the frequencies of anchor carrier 310-a (e.g., a downlink portion) for a downlink transmission, and a second UE 115 (not shown in FIG. 3, but which may be an example of a UE 115 depicted in FIG. 1, for example) may monitor a portion of or all of the frequencies of anchor carrier 310-a (e.g., a downlink portion) for a downlink transmission from a base station 105 (not shown in FIG. 3, but which may be an example of a base station 105 depicted in FIG. 1, for example). By monitoring an anchor carrier 310, the first UE 115 and second UE 115 may conserve power when compared to monitoring multiple carriers for the downlink transmission from the base station 105.

The first UE 115 may receive a first configuration message on anchor carrier 310-a, and the second UE 115 may receive a second configuration message on anchor carrier 310-a. Each configuration message may indicate a configuration for additional carriers for each UE 115 to use for communication with the base station 105. Alternatively, each UE 115 may be configured to monitor different anchor carriers with different bandwidths and/or center frequencies in the unlicensed radio frequency spectrum band 305. The first UE 115 may decode (e.g., blindly decode) the first configuration message and identify non-anchor carriers 315 for use in communicating with a base station 105. In some cases, each carrier of the non-anchor carriers 315 may be contiguous to another carrier of the non-anchor carriers 315 (e.g., non-anchor carrier 315-a may be contiguous to non-anchor carrier 315-b). The second UE 115 may decode (e.g., blindly decode) the second configuration message and identify non-anchor carrier 320 for use in communicating with base station 105. In some examples, each non-anchor carrier 315 or 320 in the unlicensed radio frequency spectrum band 305 may be located in a different narrowband region of the unlicensed radio frequency spectrum band 305.

After determining the configuration of additional carriers for communication, first UE 115 may begin to monitor non-anchor carriers 315 in addition to monitoring anchor carrier 310-b (e.g., which may be the same as anchor carrier 310-a). Similarly, second UE 115 may begin to monitor non-anchor carrier 320 in addition to monitoring anchor carrier 310-b. This may include tuning an RF chain at the first UE 115 to receive signals on non-anchor carriers 315, and tuning an RF chain at the second UE 115 to receive signals on non-anchor carrier 320. First UE 115 may then receive a resource allocation on non-anchor carriers 315 for communication with a base station 105 on non-anchor carriers 315. In some cases, the resource allocation may not be for communication on all of the non-anchor carriers 315.

The second UE 115 may also receive a resource allocation on non-anchor carrier 320 for communication with a base station 105 on non-anchor carrier 320. Each UE 115 may then communicate with base station 105 based on the resource allocation and the configured carriers. The configuration of carriers and resource allocation may be based on the capability or category of a device operating in unlicensed radio frequency spectrum band 305. This method of narrowband communication in an unlicensed spectrum may allow consistent operation across multiple geographic regions since configurations and resource allocations may be flexible depending on, for example, bandwidth and transmit power requirements in different geographic regions. The first UE 115 may transmit on non-anchor carriers 315 and on a portion or all of the frequencies of anchor carrier 310-b (e.g., an uplink portion). The second UE 115 may transmit on non-anchor carrier 320 and on a portion or all of the frequencies of anchor carrier 310-b (e.g., the uplink portion).

Figure 4:
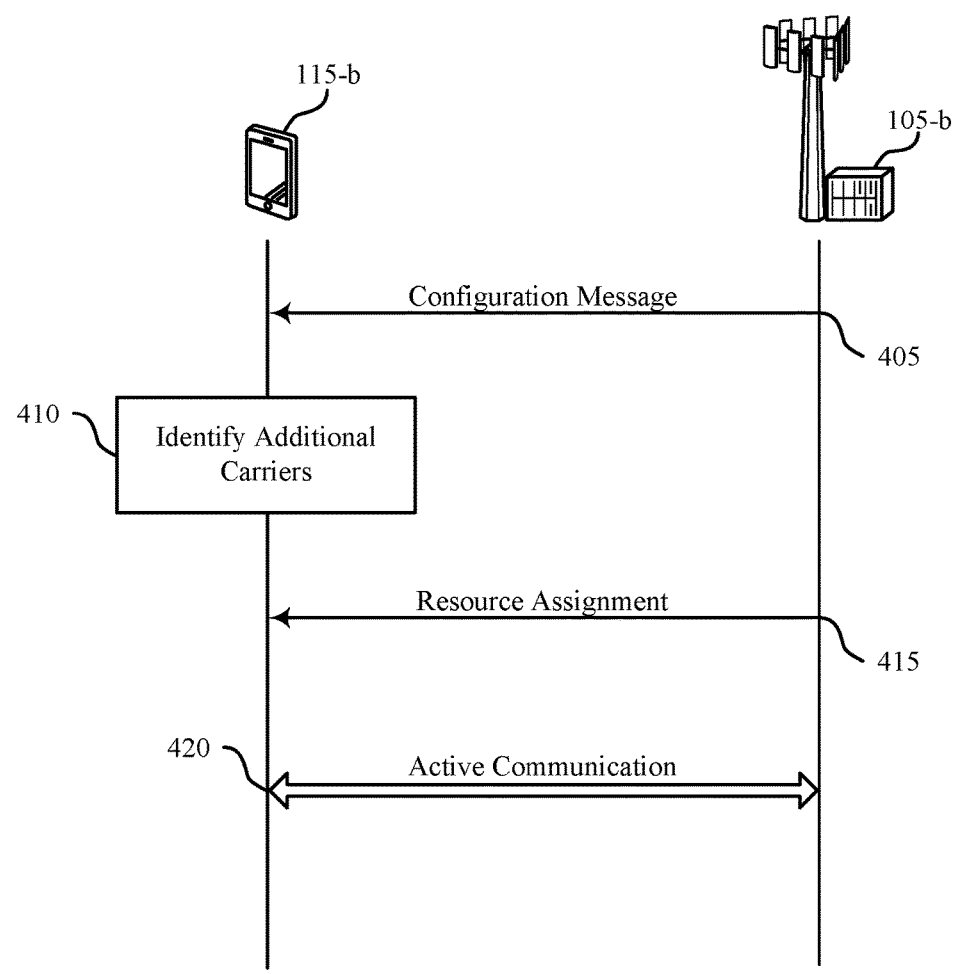
FIG. 4 illustrates an example of a process flow that supports narrowband communication for different device capabilities in unlicensed spectrum in accordance with aspects of the present disclosure.

FIG. 4 illustrates an example of a process flow 400 for narrowband communication in an unlicensed spectrum for different device capabilities in accordance with aspects of the present disclosure. In some cases, process flow 400 may represent aspects of techniques performed by a UE 115 or base station 105 as described with reference to FIG. 1, 2, or 3. In the present example, a base station 105-b may communicate with a UE 115-b in an unlicensed spectrum. UE 115-b may be a low data rate device, such as an NB-IoT device, or another device operating in a low SNR environment with a limited power supply.

At step 405, base station 105-b may transmit and UE 115-b may receive a configuration message on resources of a first carrier (e.g., an anchor carrier as described with reference to FIGS. 2 and 3) in a first narrowband region of an unlicensed radio frequency spectrum band. In some cases, prior to the configuration message transmission, UE 115-b may transmit an indication of a capability or category of UE 115-b to base station 105-b on the first carrier (e.g., on an uplink portion of the anchor carrier). In such cases, the configuration message may be based on the capability or category of UE 115-b. In some examples, UE 115-b may perform a random access procedure using resources of the first carrier, and UE 115-b may receive the configuration message during the random access procedure. Base station 105-b may also transmit an additional configuration message on the first carrier in the first narrowband region of the unlicensed radio frequency spectrum band to a second UE 115 (not shown). The additional configuration message may identify a configuration of a second set of additional carriers that may each be in different narrowband regions.

At block 410, UE 115-b may identify a configuration of additional carriers (e.g., non-anchor carriers as described with reference to FIGS. 2 and 3) for communication with base station 105-b based on the configuration message. In some cases, each carrier of the additional carriers may be in a different narrowband region of the unlicensed radio frequency spectrum band. Additionally or alternatively, the additional carriers may be contiguous to one another. In some examples, the bandwidth of each narrowband region may include a bandwidth of twelve (12) LTE subcarriers (e.g., one (1) RB). The configuration of the additional carriers may be based on the capability or category of UE 115-b. In some cases, UE 115-b may receive a system information broadcast message on resources of the first carrier, and UE 115-b may identify the different narrowband regions of the unlicensed radio frequency spectrum band based on the system information broadcast message. Additionally or alternatively, the number of carriers in the configuration may be based on the capability or category of UE 115-b.

In some cases, UE 115-b may receive synchronization signals (e.g., PSSs and/or SSSs) on resources of the first carrier (e.g., the anchor carrier). UE 115-b may monitor for the synchronization signals while operating in an RRC idle mode. UE 115-b may identify a location of the first narrowband region of the unlicensed radio frequency spectrum band based on the synchronization signals. Additionally or alternatively, UE 115-b may determine that base station 105-*b* has gained access to the first narrowband region and the different narrowband regions of the unlicensed radio frequency spectrum band based on receiving the synchronization signals. UE 115-*b* may then tune one or more RF chains to frequencies of the different narrowband regions based on determining that the base station gained access to the first narrowband region and the different narrowband regions.

At step 415, base station 105-*b* may transmit, and UE 115-*b* may receive, an assignment of resources on the additional carriers in the different narrowband regions of the unlicensed radio frequency spectrum band. In some cases, base station 105-*b* may include the resource assignment in a downlink control message (e.g., DCI), and the format of the downlink control message may be based on the capability or category of UE 115-*b*.

At step 420, UE 115-*b* and base station 105-*b* may communicate on the additional carriers in the different narrowband regions of the unlicensed radio frequency spectrum band according to the resource assignment. In some examples, base station 105-*b* may transmit and UE 115-*b* may receive a downlink data message on the resources of the additional carriers, and the format of the downlink data message may be based on the capability or category of UE 115-*b*. In further examples, UE 115-*b* may transmit an uplink control message or an uplink data message on resources of the first carrier, and the format of the uplink message may be based on the capability or category of UE 115-*b*. In yet further cases, UE 115-*b* may transmit an uplink control message or an uplink data message on resources of the additional carriers, and the format of the uplink message may be based on the capability or category of UE 115-*b*.

Figure 5:
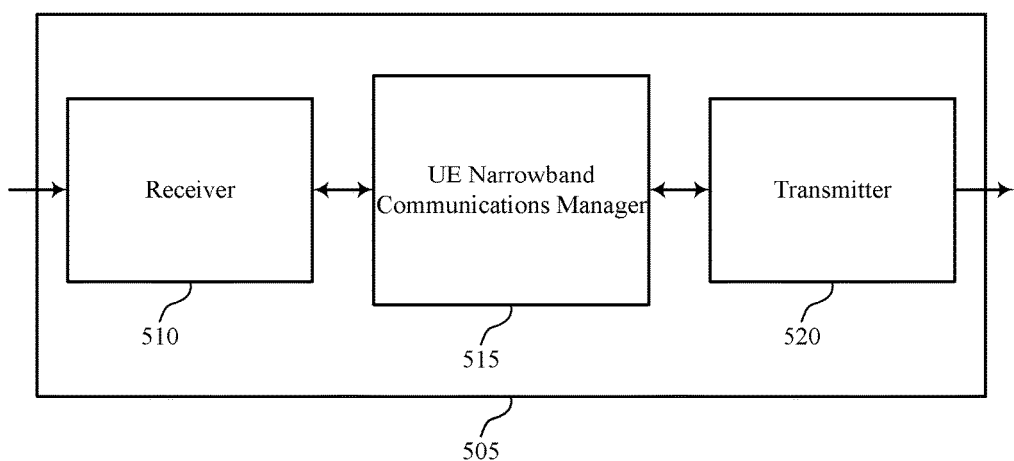
FIGS. 5 through 7 show block diagrams of a device or devices that support narrowband communication for different device capabilities in unlicensed spectrum in accordance with aspects of the present disclosure.

FIG. 5 shows a block diagram 500 of a wireless device 505 that supports narrowband communication for different device capabilities in an unlicensed spectrum in accordance with various aspects of the present disclosure. Wireless device 505 may be an example of aspects of a UE 115 as described with reference to FIG. 1. Wireless device 505 may include receiver 510, UE narrowband communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to narrowband communication for different device capabilities in an unlicensed spectrum, etc.). Information may be passed on to other components of the device. The receiver 510 may be an example of aspects of the transceiver 835 described with reference to FIG. 8.

UE narrowband communications manager 515 may be an example of aspects of the UE narrowband communications manager 815 described with reference to FIG. 8. UE narrowband communications manager 515 may receive a configuration message on resources of a first carrier in a first narrowband region of an unlicensed radio frequency spectrum band; identify, based on the configuration message, a configuration of one or more additional carriers that are each in a different narrowband region of the unlicensed radio frequency spectrum band; receive, on resources of the first carrier, an assignment of resources on the one or more additional carriers in the different narrowband regions of the unlicensed radio frequency spectrum band; and communicate on the one or more additional carriers in the different narrowband regions of the unlicensed radio frequency spectrum band according to the assignment.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
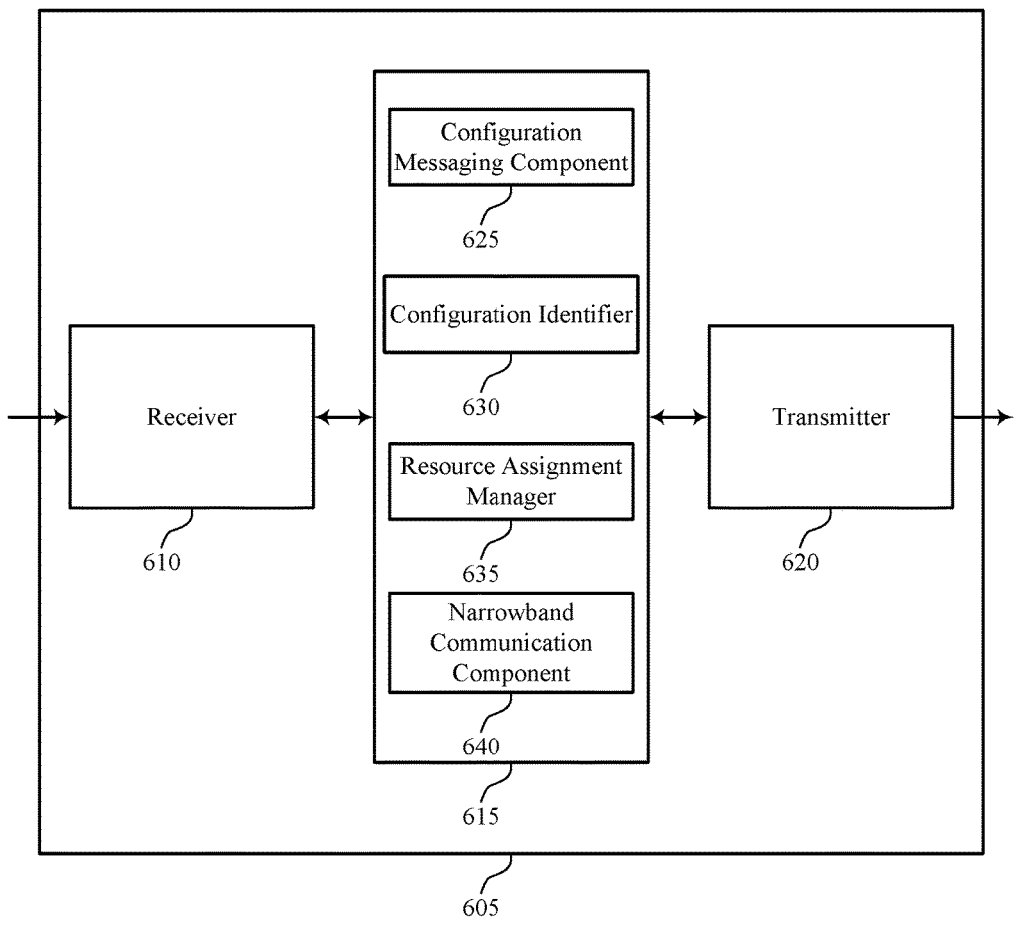

FIG. 6 shows a block diagram 600 of a wireless device 605 that supports narrowband communication for different device capabilities in an unlicensed spectrum in accordance with various aspects of the present disclosure. Wireless device 605 may be an example of aspects of a wireless device 505 or a UE 115 as described with reference to FIGS. 1 through 5. Wireless device 605 may include receiver 610, UE narrowband communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to narrowband communication for different device capabilities in an unlicensed spectrum, etc.). Information may be passed on to other components of the device. The receiver 610 may be an example of aspects of the transceiver 835 described with reference to FIG. 8.

UE narrowband communications manager 615 may be an example of aspects of the UE narrowband communications manager 815 described with reference to FIG. 8. UE narrowband communications manager 615 may also include configuration messaging component 625, configuration identifier 630, resource assignment manager 635, and narrowband communication component 640. Configuration messaging component 625 may receive (e.g., from receiver 610) a configuration message on resources of a first carrier in a first narrowband region of an unlicensed radio frequency spectrum band. Configuration identifier 630 may identify, based on the configuration message, a configuration of one or more additional carriers that are each in a different narrowband region of the unlicensed radio frequency spectrum band.

Resource assignment manager 635 may receive (e.g., from receiver 610), on resources of the first carrier, an assignment of resources on the one or more additional carriers in the different narrowband regions of the unlicensed radio frequency spectrum band. Narrowband communication component 640 may communicate (e.g., via receiver 610 and transmitter 620) on the one or more additional carriers in the different narrowband regions of the unlicensed radio frequency spectrum band according to the assignment and transmit an uplink message on resources of the first carrier in the first narrowband region. In some cases, the one or more additional carriers are contiguous to one another. In some cases, a bandwidth of each narrowband region includes a bandwidth of twelve LTE subcarriers (one (1) RB).

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
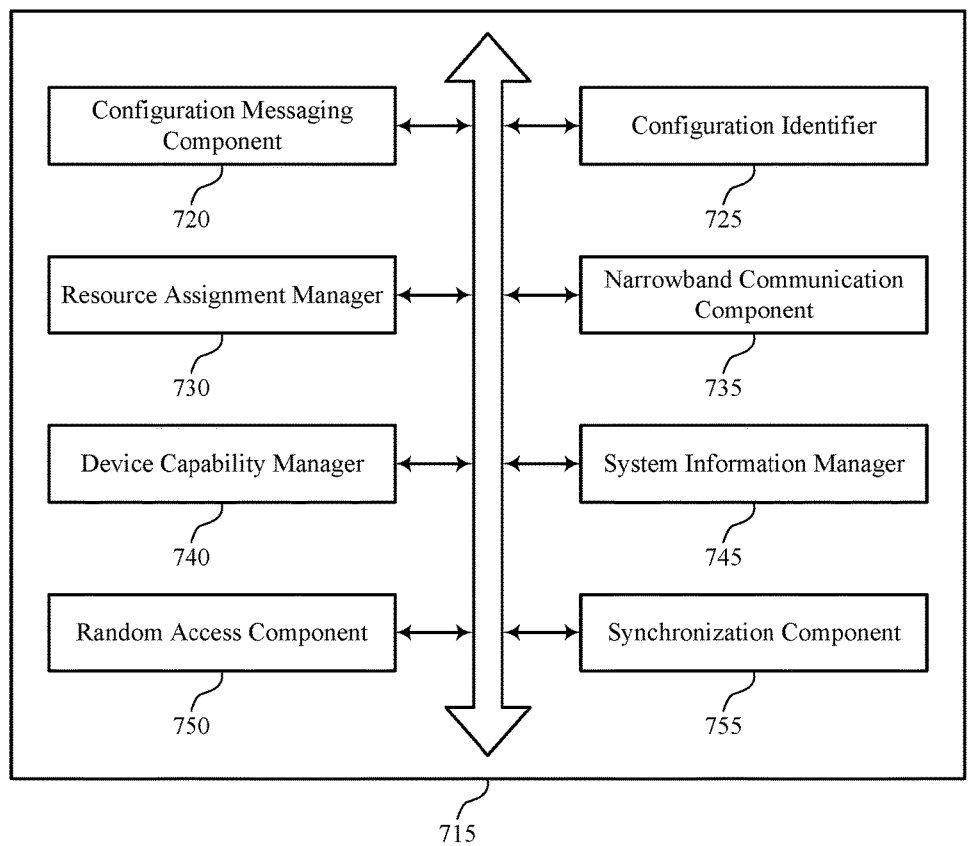

FIG. 7 shows a block diagram 700 of a UE narrowband communications manager 715 that supports narrowband communication for different device capabilities in an unlicensed spectrum in accordance with various aspects of the present disclosure. The UE narrowband communications manager 715 may be an example of aspects of a UE narrowband communications manager 515, a UE narrowband communications manager 615, or a UE narrowband communications manager 815 described with reference to FIGS. 5, 6, and 8. The UE narrowband communications manager 715 may include configuration messaging component 720, configuration identifier 725, resource assignment manager 730, narrowband communication component 735, device capability manager 740, system information manager 745, random access component 750, and synchronization component 755. Each of these modules may communicate, directly or indirectly, with one another (e.g., via one or more buses).

Configuration messaging component 720 may receive a configuration message on resources of a first carrier in a first narrowband region of an unlicensed radio frequency spectrum band. Configuration identifier 725 may identify, based on the configuration message, a configuration of one or more additional carriers that are each in a different narrowband region of the unlicensed radio frequency spectrum band. Resource assignment manager 730 may receive, on resources of the first carrier, an assignment of resources on the one or more additional carriers in the different narrowband regions of the unlicensed radio frequency spectrum band.

Narrowband communication component 735 may communicate on the one or more additional carriers in the different narrowband regions of the unlicensed radio frequency spectrum band according to the assignment and transmit an uplink message on resources of the first carrier in the first narrowband region. In some cases, the one or more additional carriers are contiguous to one another. In some cases, a bandwidth of each narrowband region includes a bandwidth of twelve LTE subcarriers (1RB).

Device capability manager 740 may transmit an indication of a capability or category of a wireless device on resources of the first carrier, where the configuration of the one or more additional carriers is based on the capability or category of the wireless device and transmit an uplink control message on resources of the first carrier, where a format of the uplink control message is based on the capability or category of the wireless device. In some cases, a number of the one or more additional carriers in the configuration is based on the capability or category of the wireless device. In some cases, receiving the assignment of resources includes receiving a downlink control message having a format that is based on the capability or category of the wireless device. In some cases, communicating on the one or more additional carriers includes receiving a downlink data message on the resources of the one or more additional carriers, where a format of the downlink data message is based on the capability or category of the wireless device. In some cases, communicating on the one or more additional carriers includes transmitting an uplink control message or an uplink data message on the resources of the one or more additional carriers, where a format of the uplink control message or the uplink data message is based on the capability or category of the wireless device.

System information manager 745 may receive a system information broadcast message on resources of the first carrier and identify the different narrowband regions of the unlicensed radio frequency spectrum band based on the system information broadcast message. Random access component 750 may perform a random access procedure using resources of the first carrier, where the configuration message is received during the random access procedure.

Synchronization component 755 may receive one or more synchronization signals on resources of the first carrier, identify a location of the first narrowband region of the unlicensed radio frequency spectrum band based on the one or more synchronization signals, determine that a base station has gained access to the first narrowband region and the different narrowband regions of the unlicensed radio frequency spectrum band based on receiving the one or more synchronization signals, tune one or more RF chains to frequencies of the different narrowband regions based on determining that the base station gained access to the first narrowband region and the different narrowband regions, and monitor for the one or more synchronization signals while operating in an RRC idle mode. In some cases, the one or more synchronization signals include a PSS and a SSS.

Figure 8:
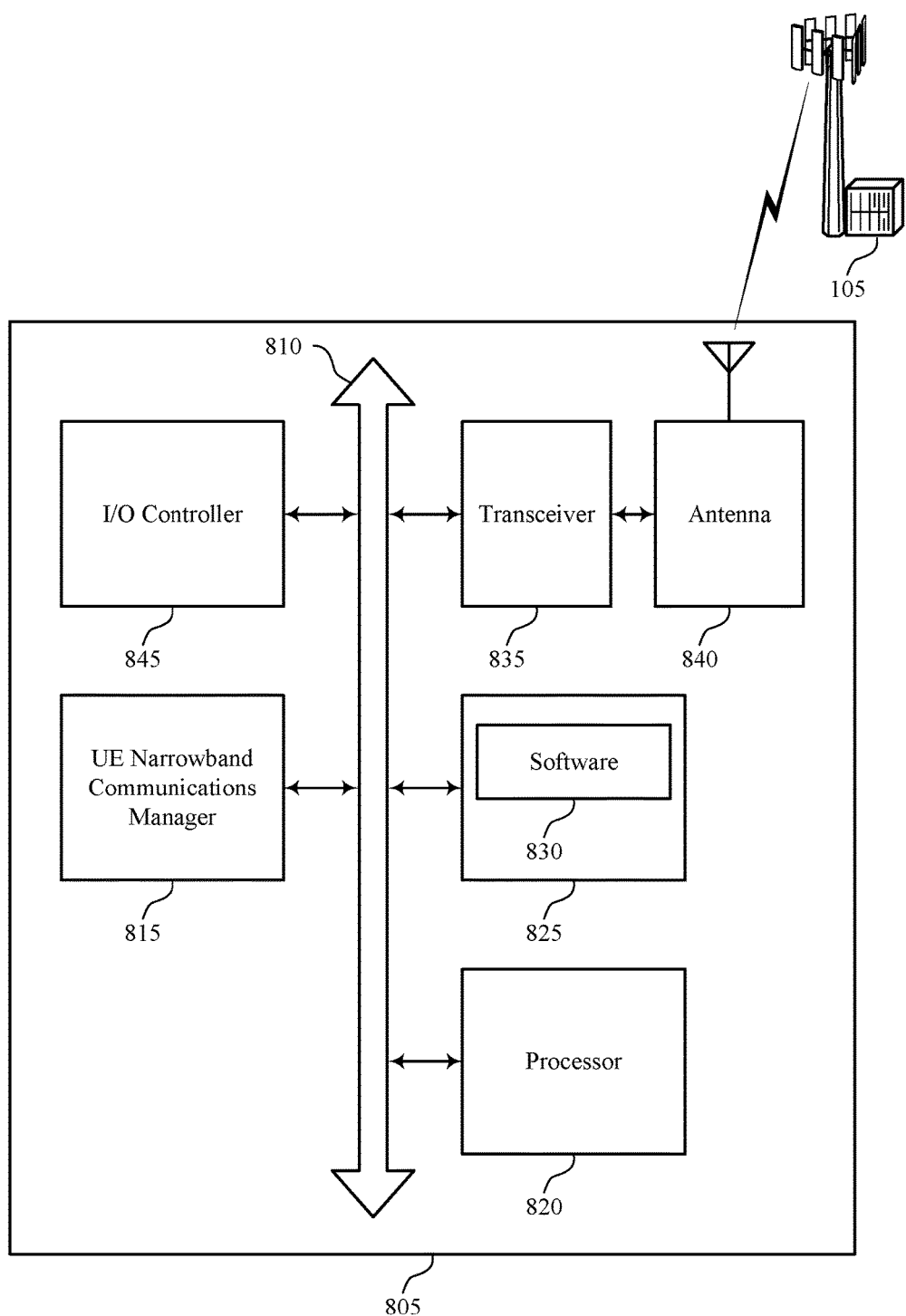
FIG. 8 illustrates a block diagram of a system including a device that supports narrowband communication for different device capabilities in unlicensed spectrum in accordance with aspects of the present disclosure.

FIG. 8 shows a diagram of a system 800 including a device 805 that supports narrowband communication for different device capabilities in an unlicensed spectrum in accordance with various aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including UE narrowband communications manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting narrowband communication for different device capabilities in an unlicensed spectrum).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support narrowband communication for different device capabilities in an unlicensed spectrum. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions. I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
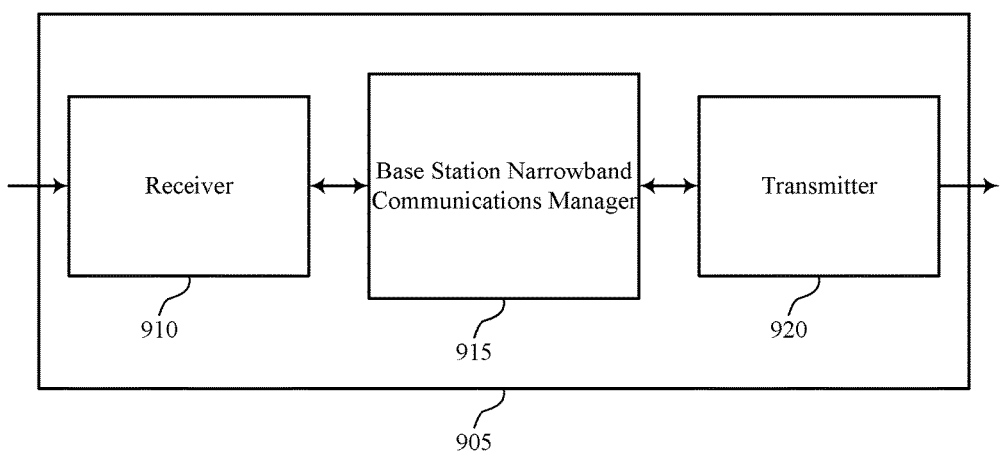
FIGS. 9 through 11 show block diagrams of a device or devices that support narrowband communication for different device capabilities in unlicensed spectrum in accordance with aspects of the present disclosure.

FIG. 9 shows a block diagram 900 of a wireless device 905 that supports narrowband communication for different device capabilities in an unlicensed spectrum in accordance with various aspects of the present disclosure. Wireless device 905 may be an example of aspects of a base station 105 as described with reference to FIGS. 1 through 4. Wireless device 905 may include receiver 910, base station narrowband communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to narrowband communication for different device capabilities in an unlicensed spectrum, etc.). Information may be passed on to other components of the device. The receiver 910 may be an example of aspects of the transceiver 1235 described with reference to FIG. 12.

Base station narrowband communications manager 915 may be an example of aspects of the base station narrowband communications manager 1215 described with reference to FIG. 12. Base station narrowband communications manager 915 may transmit (e.g., via transmitter 920) a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band, transmit, on resources of the first carrier to the first wireless device, an assignment of resources on the first set of additional carriers in the different narrowband regions of the unlicensed radio frequency spectrum band, and communicate with the first wireless device on the first set of additional carriers in the different narrowband regions of the unlicensed radio frequency spectrum band according to the assignment.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
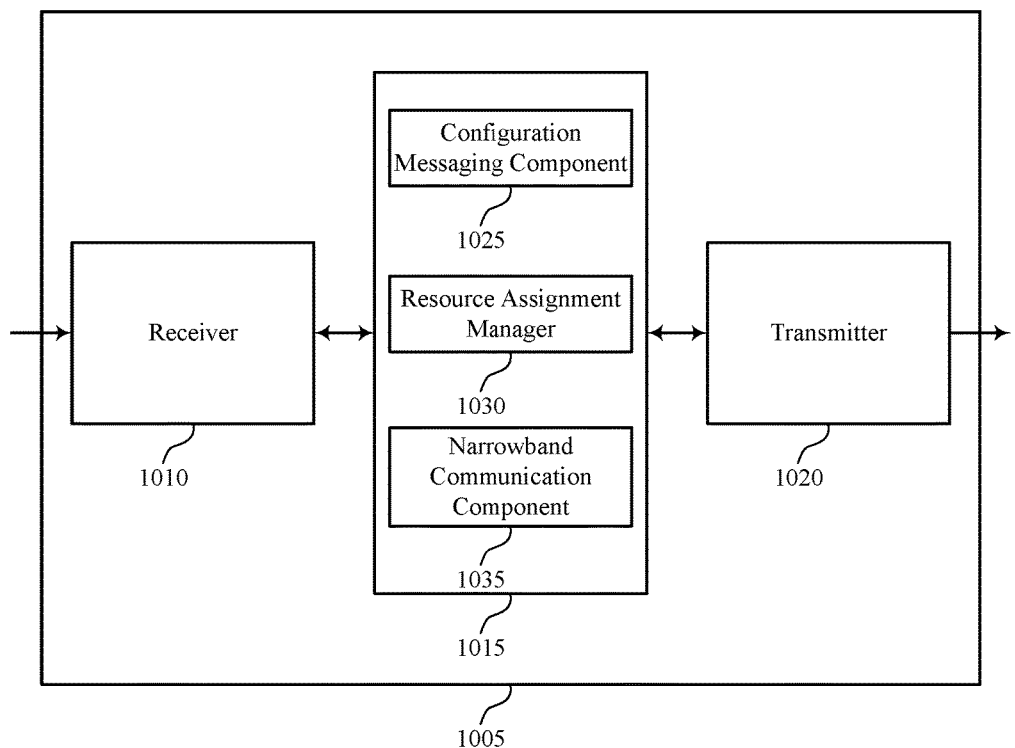

FIG. 10 shows a block diagram 1000 of a wireless device 1005 that supports narrowband communication for different device capabilities in an unlicensed spectrum in accordance with various aspects of the present disclosure. Wireless device 1005 may be an example of aspects of a wireless device 905 or a base station 105 as described with reference to FIGS. 1, 2, 3, 4, and 9. Wireless device 1005 may include receiver 1010, base station narrowband communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to narrowband communication for different device capabilities in an unlicensed spectrum, etc.). Information may be passed on to other components of the device. The receiver 1010 may be an example of aspects of the transceiver 1235 described with reference to FIG. 12.

Base station narrowband communications manager 1015 may be an example of aspects of the base station narrowband communications manager 1215 described with reference to FIG. 12. Base station narrowband communications manager 1015 may also include configuration messaging component 1025, resource assignment manager 1030, and narrowband communication component 1035. Configuration messaging component 1025 may transmit a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band.

Resource assignment manager 1030 may transmit, on resources of the first carrier to the first wireless device, an assignment of resources on the first set of additional carriers in the different narrowband regions of the unlicensed radio frequency spectrum band. Narrowband communication component 1035 may communicate with the first wireless device on the first set of additional carriers in the different narrowband regions of the unlicensed radio frequency spectrum band according to the assignment; transmit an additional configuration message on the first carrier in the first narrowband region of the unlicensed radio frequency spectrum band to a second wireless device, where the additional configuration message identifies a configuration of a second set of additional carriers that are each different narrowband regions; and receive an uplink message from the first wireless device on resources of the first carrier in the first narrowband region. In some cases, each carrier of the first set of additional carriers is contiguous to another carrier of the first set of additional carriers.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
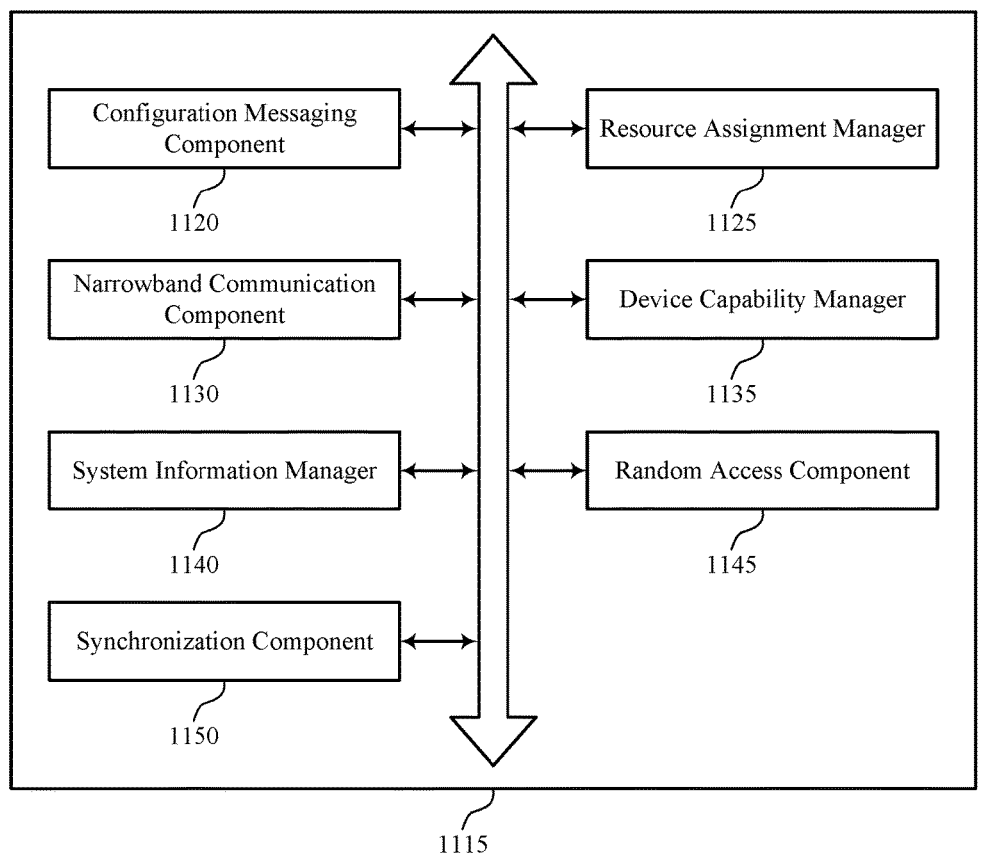

FIG. 11 shows a block diagram 1100 of a base station narrowband communications manager 1115 that supports narrowband communication for different device capabilities in an unlicensed spectrum in accordance with various aspects of the present disclosure. The base station narrowband communications manager 1115 may be an example of aspects of a base station narrowband communications manager 915, 1015, or 1215 described with reference to FIGS. 9, 10, and 12. The base station narrowband communications manager 1115 may include configuration messaging component 1120, resource assignment manager 1125, narrowband communication component 1130, device capability manager 1135, system information manager 1140, random access component 1145, and synchronization component 1150. Each of these modules may communicate, directly or indirectly, with one another (e.g., via one or more buses).

Configuration messaging component 1120 may transmit a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band. Resource assignment manager 1125 may transmit, on resources of the first carrier to the first wireless device, an assignment of resources on the first set of additional carriers in the different narrowband regions of the unlicensed radio frequency spectrum band.

Narrowband communication component 1130 may communicate with the first wireless device on the first set of additional carriers in the different narrowband regions of the unlicensed radio frequency spectrum band according to the assignment; transmit an additional configuration message on the first carrier in the first narrowband region of the unlicensed radio frequency spectrum band to a second wireless device, where the additional configuration message identifies a configuration of a second set of additional carriers that are each different narrowband regions; and receive an uplink message from the first wireless device on resources of the first carrier in the first narrowband region. In some cases, each carrier of the first set of additional carriers is contiguous to another carrier of the first set of additional carriers.

Device capability manager 1135 may receive an indication of a capability or category of the first wireless device on resources of the first carrier, where the configuration of the first set of additional carriers is based on the capability or category of the first wireless device and receive an uplink control message on resources of the first carrier, where a format of the uplink control message is based on the capability or category of the first wireless device. In some cases, a number of carriers in the first set of additional carriers in the configuration is based on the capability or category of the first wireless device. In some cases, transmitting the assignment of resources includes transmitting a downlink control message having a format that is based on the capability or category of the first wireless device. In some cases, communicating on the first set of additional carriers includes transmitting a downlink data message on the resources of the first set of additional carriers, where a format of the downlink data message is based on the capability or category of the first wireless device. In some cases, communicating on the first set of additional carriers includes receiving an uplink control message or an uplink data message on the resources of the first set of additional carriers, where a format of the uplink control message or the uplink data message is based on the capability or category of the first wireless device.

System information manager 1140 may transmit a system information broadcast message on resources of the first carrier, where the system information broadcast message identifies the different narrowband regions of the unlicensed radio frequency spectrum band. Random access component 1145 may perform a random access procedure with the first wireless device using resources of the first carrier, where the configuration message is transmitted during the random access procedure. Synchronization component 1150 may transmit one or more synchronization signals (e.g., PSSs or SSSs) on resources of the first carrier.

Figure 12:
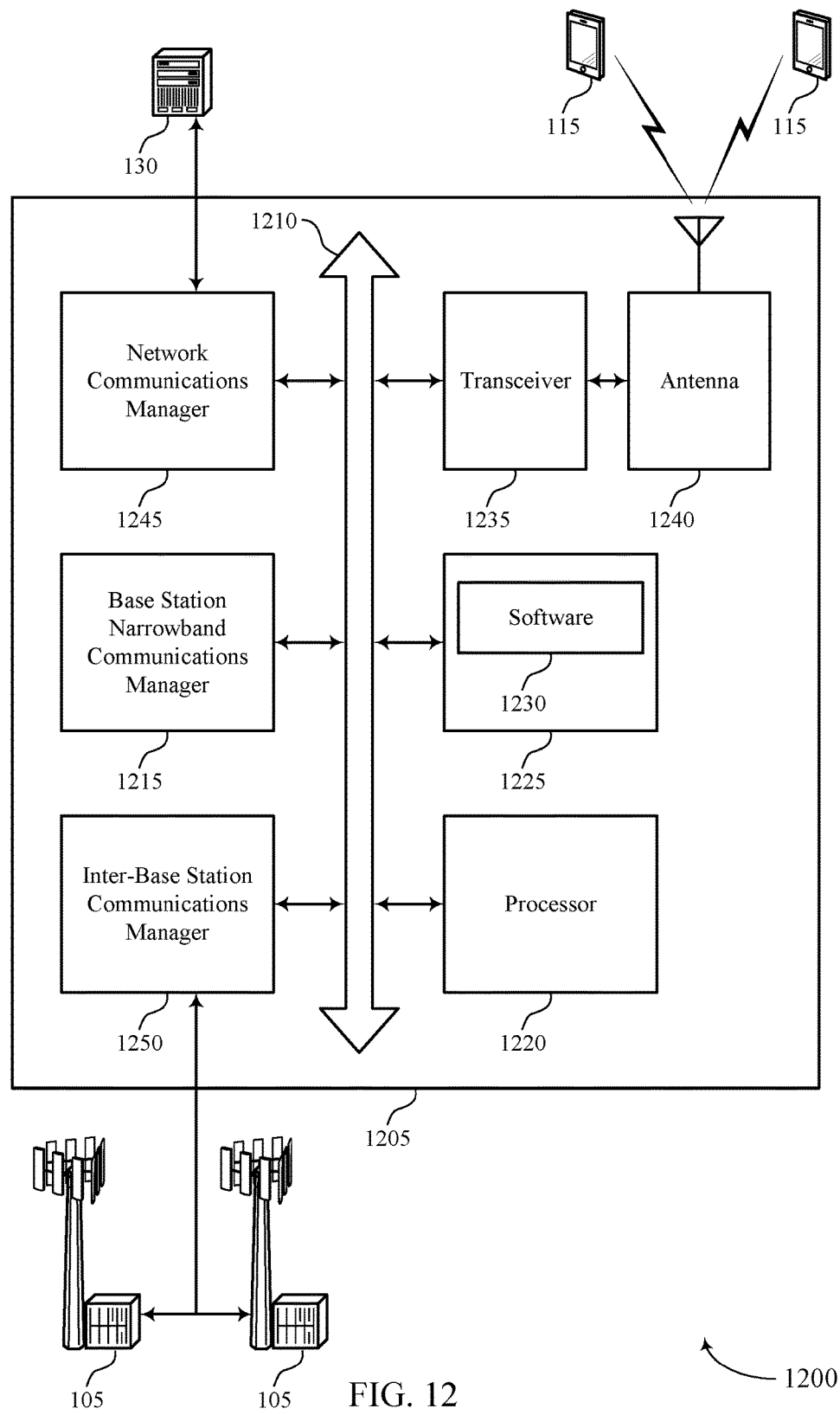
FIG. 12 illustrates a block diagram of a system including a device, such as a base station, that supports narrowband communication for different device capabilities in unlicensed spectrum in accordance with aspects of the present disclosure.

FIG. 12 shows a diagram of a system 1200 including a device 1205 that supports narrowband communication for different device capabilities in an unlicensed spectrum in accordance with various aspects of the present disclosure. Device 1205 may be an example of or include the components of base station 105 as described above, e.g., with reference to FIG. 1. Device 1205 may include components for bi-directional voice and data communications including components for transmitting and receiving communications, including base station narrowband communications manager 1215, processor 1220, memory 1225, software 1230, transceiver 1235, antenna 1240, network communications manager 1245, and inter-base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting narrowband communication for different device capabilities in an unlicensed spectrum).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support narrowband communication for different device capabilities in an unlicensed spectrum. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-base station communications manager 1250 may manage communications with other base station 105, and may include a controller or scheduler for controlling communications with UEs 115 in cooperation with other base stations 105. For example, the inter-base station communications manager 1250 may coordinate scheduling for transmissions to UEs 115 for various interference mitigation techniques such as beamforming or joint transmission. In some examples, inter-base station communications manager 1250 may provide an X2 interface within an LTE/LTE-A wireless communication network technology to provide communication between base stations 105.

Figure 13:
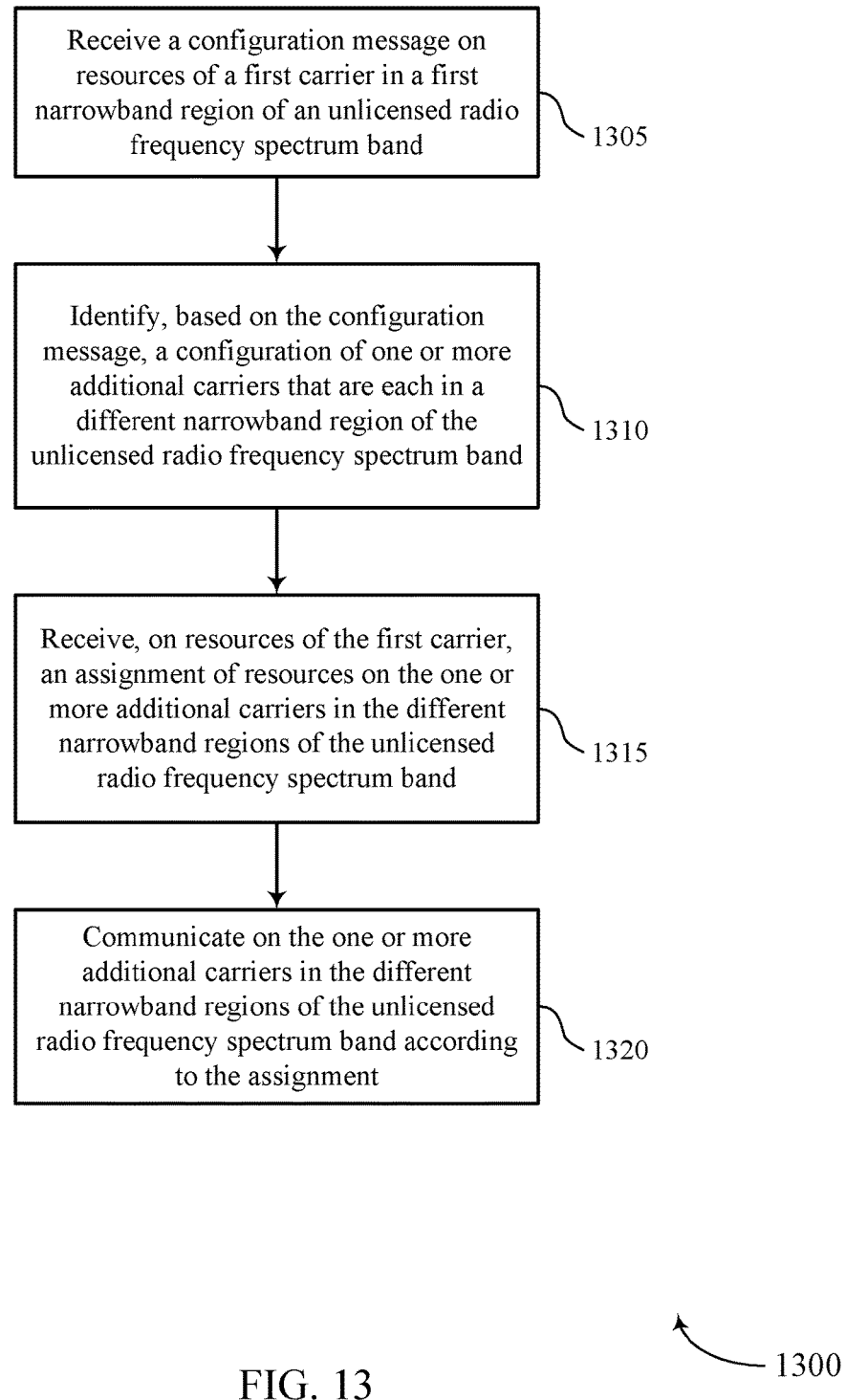
FIGS. 13 through 16 illustrate methods for narrowband communication for different device capabilities in unlicensed spectrum in accordance with aspects of the present disclosure.

FIG. 13 shows a flowchart illustrating a method 1300 for narrowband communication for different device capabilities in an unlicensed spectrum in accordance with various aspects of the present disclosure. The operations of method 1300 may be implemented by a UE 115 or its components as described herein. For example, the operations of method 1300 may be performed by a UE narrowband communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive a configuration message on resources of a first carrier in a first narrowband region of an unlicensed radio frequency spectrum band. The operations of block 1305 may be performed according to the methods described with reference to FIGS. 1 through 4. In certain examples, aspects of the operations of block 1305 may be performed by a configuration messaging component as described with reference to FIGS. 5 through 8.

At block 1310 the UE 115 may identify, based at least in part on the configuration message, a configuration of one or more additional carriers that are each in a different narrowband region of the unlicensed radio frequency spectrum band. The operations of block 1310 may be performed according to the methods described with reference to FIGS. 1 through 4. In certain examples, aspects of the operations of block 1310 may be performed by a configuration identifier as described with reference to FIGS. 5 through 8.

At block 1315 the UE 115 may receive, on resources of the first carrier, an assignment of resources on the one or more additional carriers in the different narrowband regions of the unlicensed radio frequency spectrum band. The operations of block 1315 may be performed according to the methods described with reference to FIGS. 1 through 4. In certain examples, aspects of the operations of block 1315 may be performed by a resource assignment manager as described with reference to FIGS. 5 through 8.

At block 1320 the UE 115 may communicate on the one or more additional carriers in the different narrowband regions of the unlicensed radio frequency spectrum band according to the assignment. The operations of block 1320 may be performed according to the methods described with reference to FIGS. 1 through 4. In certain examples, aspects of the operations of block 1320 may be performed by a narrowband communication component as described with reference to FIGS. 5 through 8.

Figure 14:
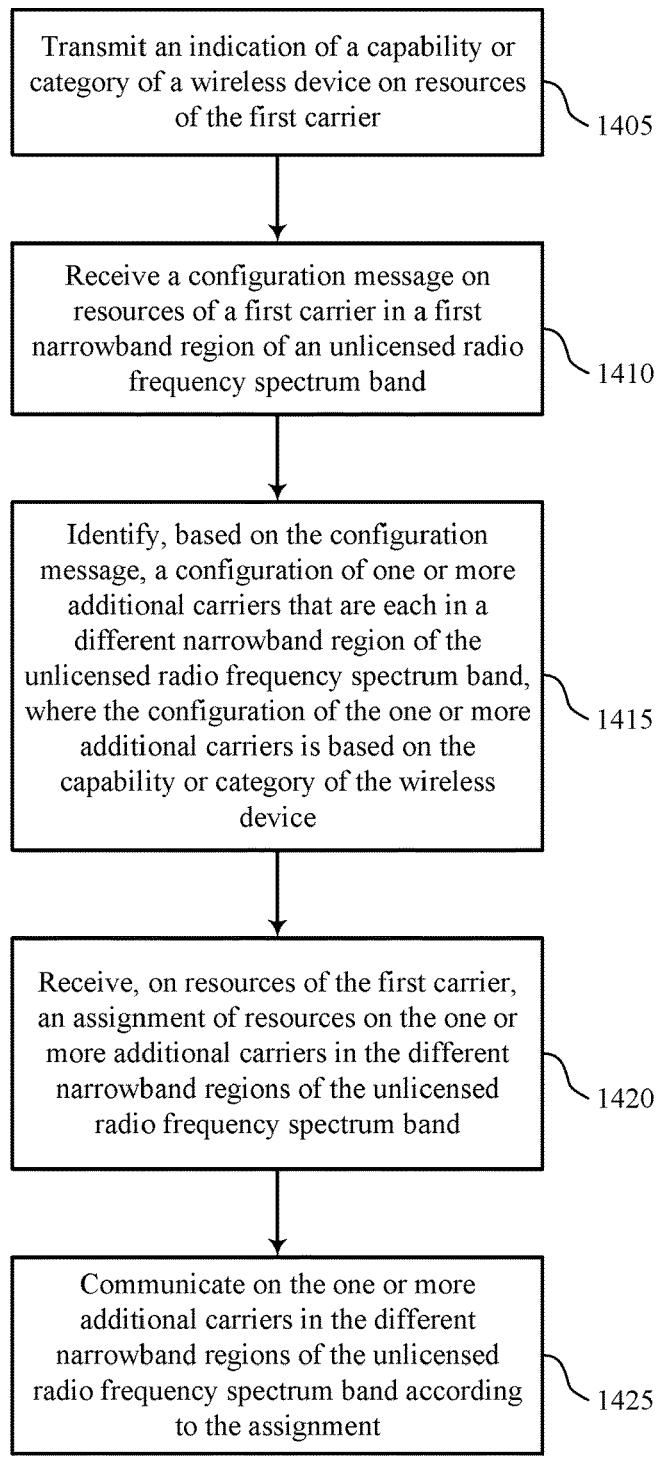

FIG. 14 shows a flowchart illustrating a method 1400 for narrowband communication for different device capabilities in an unlicensed spectrum in accordance with various aspects of the present disclosure. The operations of method 1400 may be implemented by a UE 115 or its components as described herein. For example, the operations of method 1400 may be performed by a UE narrowband communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may transmit an indication of a capability or category of a wireless device on resources of the first carrier. The operations of block 1405 may be performed according to the methods described with reference to FIGS. 1 through 4. In certain examples, aspects of the operations of block 1405 may be performed by a device capability manager as described with reference to FIGS. 5 through 8.

At block 1410 the UE 115 may receive a configuration message on resources of a first carrier in a first narrowband region of an unlicensed radio frequency spectrum band. The operations of block 1410 may be performed according to the methods described with reference to FIGS. 1 through 4. In certain examples, aspects of the operations of block 1410 may be performed by a configuration messaging component as described with reference to FIGS. 5 through 8.

At block 1415 the UE 115 may identify, based at least in part on the configuration message, a configuration of one or more additional carriers that are each in a different narrowband region of the unlicensed radio frequency spectrum band, where the configuration of the one or more additional carriers is based on the capability or category of the wireless device. The operations of block 1415 may be performed according to the methods described with reference to FIGS. 1 through 4. In certain examples, aspects of the operations of block 1415 may be performed by a configuration identifier as described with reference to FIGS. 5 through 8.

At block 1420 the UE 115 may receive, on resources of the first carrier, an assignment of resources on the one or more additional carriers in the different narrowband regions of the unlicensed radio frequency spectrum band. The operations of block 1420 may be performed according to the methods described with reference to FIGS. 1 through 4. In certain examples, aspects of the operations of block 1420 may be performed by a resource assignment manager as described with reference to FIGS. 5 through 8.

At block 1425 the UE 115 may communicate on the one or more additional carriers in the different narrowband regions of the unlicensed radio frequency spectrum band according to the assignment. The operations of block 1425 may be performed according to the methods described with reference to FIGS. 1 through 4. In certain examples, aspects of the operations of block 1425 may be performed by a narrowband communication component as described with reference to FIGS. 5 through 8.

Figure 15:
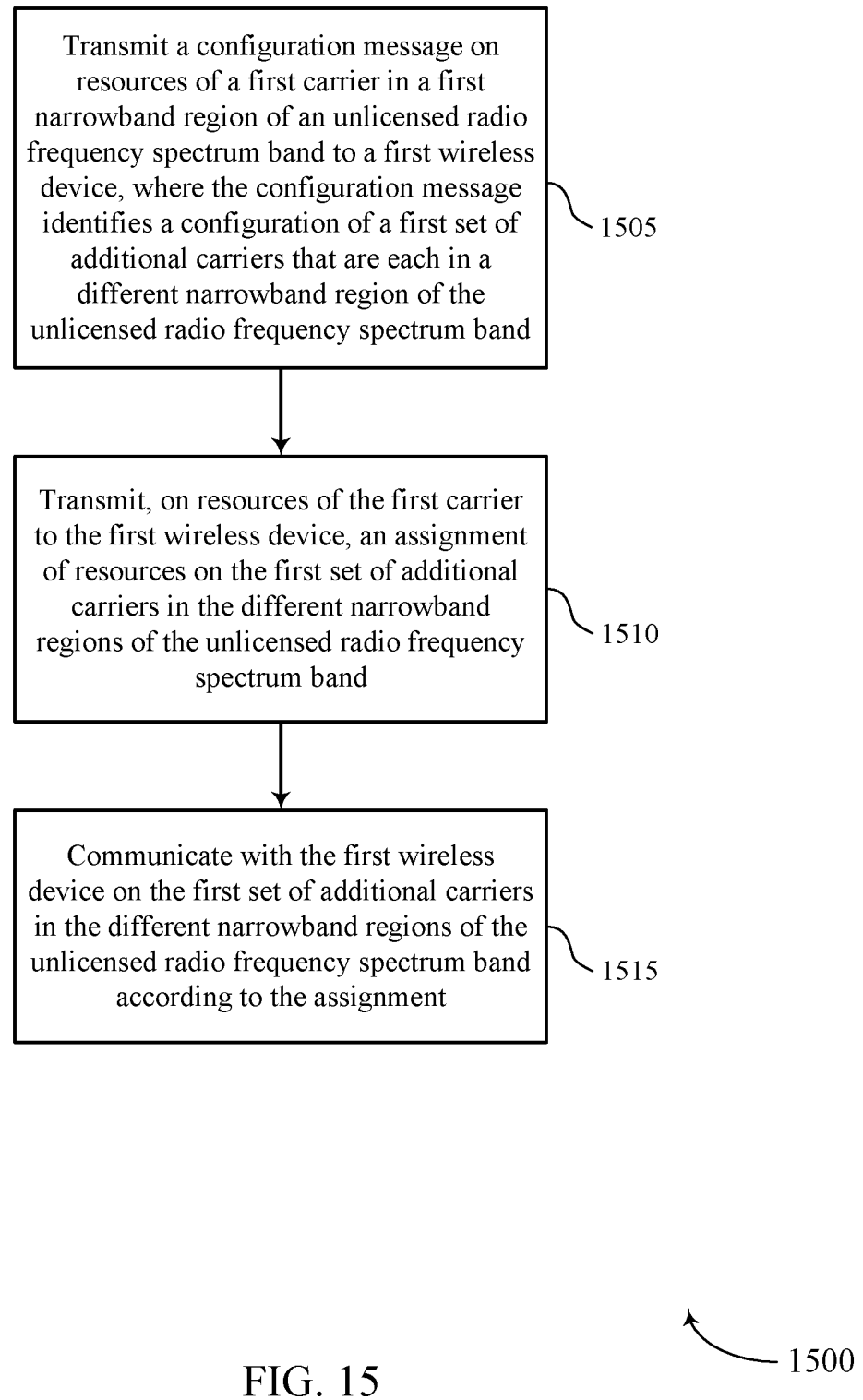

FIG. 15 shows a flowchart illustrating a method 1500 for narrowband communication for different device capabilities in an unlicensed spectrum in accordance with various aspects of the present disclosure. The operations of method 1500 may be implemented by a base station 105 or its components as described herein. For example, the operations of method 1500 may be performed by a base station narrowband communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band. The operations of block 1505 may be performed according to the methods described with reference to FIGS. 1 through 4. In certain examples, aspects of the operations of block 1505 may be performed by a configuration messaging component as described with reference to FIGS. 9 through 12.

At block 1510 the base station 105 may transmit, on resources of the first carrier to the first wireless device, an assignment of resources on the first set of additional carriers in the different narrowband regions of the unlicensed radio frequency spectrum band. The operations of block 1510 may be performed according to the methods described with reference to FIGS. 1 through 4. In certain examples, aspects of the operations of block 1510 may be performed by a resource assignment manager as described with reference to FIGS. 9 through 12.

At block 1515 the base station 105 may communicate with the first wireless device on the first set of additional carriers in the different narrowband regions of the unlicensed radio frequency spectrum band according to the assignment. The operations of block 1515 may be performed according to the methods described with reference to FIGS. 1 through 4. In certain examples, aspects of the operations of block 1515 may be performed by a narrowband communication component as described with reference to FIGS. 9 through 12.

Figure 16:
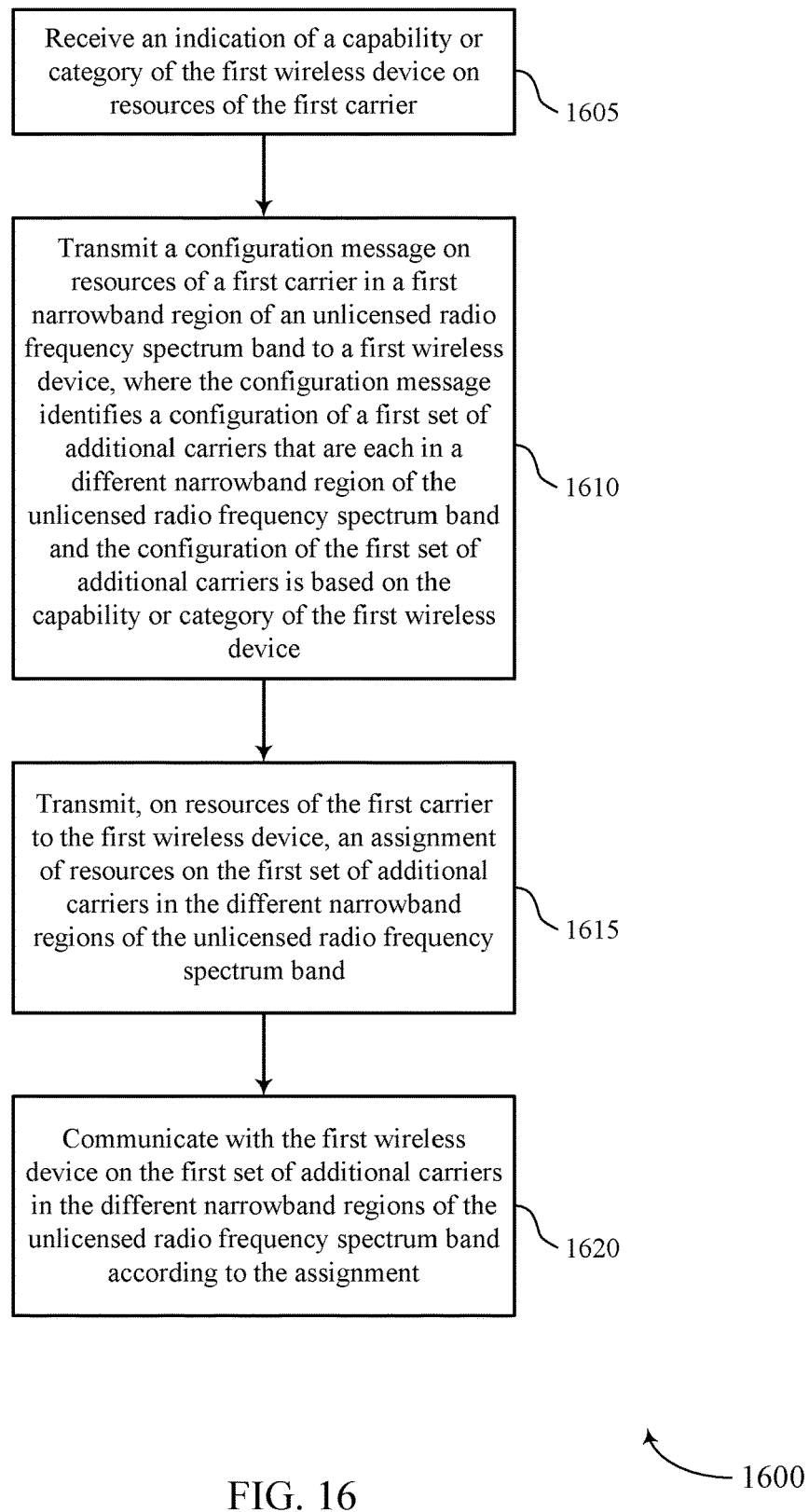

FIG. 16 shows a flowchart illustrating a method 1600 for narrowband communication for different device capabilities in an unlicensed spectrum in accordance with various aspects of the present disclosure. The operations of method 1600 may be implemented by a base station 105 or its components as described herein. For example, the operations of method 1600 may be performed by a base station narrowband communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may receive an indication of a capability or category of the first wireless device on resources of the first carrier. The operations of block 1605 may be performed according to the methods described with reference to FIGS. 1 through 4. In certain examples, aspects of the operations of block 1605 may be performed by a device capability manager as described with reference to FIGS. 9 through 12.

At block 1610 the base station 105 may transmit a configuration message on resources of a first carrier in a first narrowband region of an unlicensed radio frequency spectrum band to a first wireless device, where the configuration message identifies a configuration of a first set of additional carriers that are each in a different narrowband region of the unlicensed radio frequency spectrum band and the configuration of the first set of additional carriers is based on the capability or category of the first wireless device. The operations of block 1610 may be performed according to the methods described with reference to FIGS. 1 through 4. In certain examples, aspects of the operations of block 1610 may be performed by a configuration messaging component as described with reference to FIGS. 9 through 12.

At block 1615 the base station 105 may transmit, on resources of the first carrier to the first wireless device, an assignment of resources on the first set of additional carriers in the different narrowband regions of the unlicensed radio frequency spectrum band. The operations of block 1615 may be performed according to the methods described with reference to FIGS. 1 through 4. In certain examples, aspects of the operations of block 1615 may be performed by a resource assignment manager as described with reference to FIGS. 9 through 12.

At block 1620 the base station 105 may communicate with the first wireless device on the first set of additional carriers in the different narrowband regions of the unlicensed radio frequency spectrum band according to the assignment. The operations of block 1620 may be performed according to the methods described with reference to FIGS. 1 through 4. In certain examples, aspects of the operations of block 1620 may be performed by a narrowband communication component as described with reference to FIGS. 9 through 12.

It should be noted that the methods described above describe possible implementations, and that the operations and the steps may be rearranged or otherwise modified and that other implementations are possible. Furthermore, aspects from two or more of the methods 1300, 1400, 1500, or 1600 described with reference to FIG. 13, 14, 15, or 16 may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). 3GPP LTE and LTE-A are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting an indication of a capability of a wireless device on resources of a first carrier in a first narrowband region of a radio frequency spectrum band;
   receiving a configuration message on the resources of the first carrier;
   identifying, based at least in part on the configuration message, a configuration of one or more additional carriers that are in a different narrowband regions of the radio frequency spectrum band, wherein the configuration of the one or more additional carriers is based at least in part on the capability of the wireless device;
   receiving, on the resources of the first carrier, an assignment of resources on the one or more additional carriers in the different narrowband regions of the radio frequency spectrum band; and
   communicating on the one or more additional carriers in the different narrowband regions of the radio frequency spectrum band according to the assignment.

2. The method of claim 1, wherein the one or more additional carriers are contiguous to one another.

3. The method of claim 1, further comprising:
   transmitting an uplink message on the resources of the first carrier in the first narrowband region.

4. The method of claim 1, wherein a number of the one or more additional carriers in the configuration is based at least in part on the capability of the wireless device.

5. The method of claim 1, wherein receiving the assignment of resources comprises:
   receiving a downlink control message having a format that is based at least in part on the capability of the wireless device.

6. The method of claim 1, wherein communicating on the one or more additional carriers comprises:
   receiving a downlink data message on the resources of the one or more additional carriers, wherein a format of the downlink data message is based at least in part on the capability of the wireless device.

7. The method of claim 1, further comprising:
   transmitting an uplink control message on the resources of the first carrier, wherein a format of the uplink control message is based at least in part on the capability of the wireless device.

8. The method of claim 1, wherein communicating on the one or more additional carriers comprises:
   transmitting an uplink control message or an uplink data message on the resources of the one or more additional carriers, wherein a format of the uplink control message or the uplink data message is based at least in part on the capability of the wireless device.

9. The method of claim 1, wherein a bandwidth of each narrowband region comprises a bandwidth of twelve Long Term Evolution (LTE) subcarriers (1RB).

10. The method of claim 1, further comprising:
    receiving a system information broadcast message on the resources of the first carrier; and
    identifying the different narrowband regions of the radio frequency spectrum band based at least in part on the system information broadcast message.

11. The method of claim 1, further comprising:
    performing a random access procedure using resources of the first carrier, wherein the configuration message is received during the random access procedure.

12. The method of claim 1, further comprising:
    receiving one or more synchronization signals on the resources of the first carrier.

13. The method of claim 12, further comprising:
    identifying a location of the first narrowband region of the radio frequency spectrum band based at least in part on the one or more synchronization signals.

14. The method of claim 12, further comprising:
    determining that a base station has gained access to the first narrowband region and the different narrowband regions of the radio frequency spectrum band based at least in part on receiving the one or more synchronization signals; and
    tuning one or more radio frequency (RF) chains to frequencies of the different narrowband regions based at least in part on determining that the base station gained access to the first narrowband region and the different narrowband regions.

15. The method of claim 14, further comprising:
monitoring for the one or more synchronization signals while operating in a radio resource control (RRC) idle mode.

16. The method of claim 12, wherein the one or more synchronization signals comprise a primary synchronization signal (PSS) and a secondary synchronization signal (SSS).

17. A method for wireless communication, comprising:
receiving an indication of a capability of a first wireless device on resources of a first carrier in a first narrow band region of a radio frequency spectrum band;
transmitting a configuration message on the resources of the first carrier to the first wireless device, wherein the configuration message identifies a configuration of a first set of additional carriers that are in a different narrowband regions of the radio frequency spectrum band and wherein the configuration of the first set of additional carriers is based at least in part on the capability of the first wireless device;
transmitting, on the resources of the first carrier to the first wireless device, an assignment of resources on the first set of additional carriers in the different narrowband regions of the radio frequency spectrum band; and
communicating with the first wireless device on the first set of additional carriers in the different narrowband regions of the radio frequency spectrum band according to the assignment.

18. The method of claim 17, further comprising:
transmitting an additional configuration message on the first carrier in the first narrowband region of the radio frequency spectrum band to a second wireless device, wherein the additional configuration message identifies a configuration of a second set of additional carriers that are in the different narrowband regions.

19. The method of claim 17, wherein each carrier of the first set of additional carriers is contiguous to another carrier of the first set of additional carriers.

20. The method of claim 17, further comprising:
receiving an uplink message from the first wireless device on the resources of the first carrier in the first narrowband region.

21. The method of claim 17, wherein a number of carriers in the first set of additional carriers in the configuration is based at least in part on the capability of the first wireless device.

22. The method of claim 17, wherein transmitting the assignment of resources comprises:
transmitting a downlink control message having a format that is based at least in part on the capability of the first wireless device.

23. The method of claim 17, wherein communicating on the first set of additional carriers comprises:
transmitting a downlink data message on the resources of the first set of additional carriers, wherein a format of the downlink data message is based at least in part on the capability of the first wireless device.

24. The method of claim 17, further comprising:
receiving an uplink control message on the resources of the first carrier, wherein a format of the uplink control message is based at least in part on the capability of the first wireless device.

25. The method of claim 17 wherein communicating on the first set of additional carriers comprises:
receiving an uplink control message or an uplink data message on the resources of the first set of additional carriers, wherein a format of the uplink control message or the uplink data message is based at least in part on the capability of the first wireless device.

26. The method of claim 17, further comprising:
transmitting a system information broadcast message on the resources of the first carrier, wherein the system information broadcast message identifies the different narrowband regions of the radio frequency spectrum band.

27. The method of claim 17, further comprising:
performing a random access procedure with the first wireless device using resources of the first carrier, wherein the configuration message is transmitted during the random access procedure.

28. The method of claim 17, further comprising:
transmitting one or more synchronization signals on the resources of the first carrier.

29. An apparatus for wireless communication, comprising:
means for transmitting an indication of a capability of a wireless device on resources of a first carrier in a first narrowband region of a radio frequency spectrum band;
means for receiving a configuration message on the resources of the first carrier;
means for identifying, based at least in part on the configuration message, configuration of one or more additional carriers that are in a different narrowband regions of the radio frequency spectrum band, wherein the configuration of the one or more additional carriers is based at least in part on the capability of the wireless device;
means for receiving, on the resources of the first carrier, an assignment of resources on the one or more additional carriers in the different narrowband regions of the radio frequency spectrum band; and
means for communicating on the one or more additional carriers in the different narrowband regions of the radio frequency spectrum band according to the assignment.

30. An apparatus for wireless communication, comprising:
means for receiving an indication of a capability of a first wireless device on resources of a first carrier in a first narrow band region of a radiofrequency spectrum band;
means for transmitting a configuration message on the resources of the first carrier to the first wireless device, wherein the configuration message identifies a configuration of a first set of additional carriers that are in a different narrowband regions of the radio frequency spectrum band and wherein the configuration of the first set of additional carriers is based at least in part on the capability of the first wireless device
means for transmitting, on the resources of the first carrier to the first wireless device, an assignment of resources on the first set of additional carriers in the different narrowband regions of the radio frequency spectrum band; and
means for communicating with the first wireless device on the first set of additional carriers in the different narrowband regions of the radio frequency spectrum band according to the assignment.

31. An apparatus for wireless communication, in a system comprising:
a processor;
memory in electronic communication with the processor; and instructions stored in the memory and operable, when executed by the processor, to cause the apparatus to:
  transmit an indication of a capability of a wireless device on resources of a first carrier in a first narrowband region of a radio frequency spectrum band;
  receive a configuration message on the resources of the first carrier;
  identify, based at least in part on the configuration message, a configuration of one or more additional carriers that are in a different narrowband regions of the radio frequency spectrum band, wherein the configuration of the one or more additional carriers is based at least in part on the capability of the wireless device;
  receive, on the resources of the first carrier, an assignment of resources on the one or more additional carriers in the different narrowband regions of the radio frequency spectrum band; and
  communicate on the one or more additional carriers in the different narrowband regions of the radio frequency spectrum band according to the assignment.

32. The apparatus of claim 31, wherein the one or more additional carriers are contiguous to one another.

33. The apparatus of claim 31, wherein the instructions are further executable by the processor to cause the apparatus to:
  transmit an uplink message on the resources of the first carrier in the first narrowband region.

34. The apparatus of claim 31, wherein a number of the one or more additional carriers in the configuration is based at least in part on the capability of the wireless device.

35. The apparatus of claim 31, wherein the instructions are further executable by the processor to cause the apparatus to:
  receive a downlink control message having a format that is based at least in part on the capability of the wireless device.

36. The apparatus of claim 31, wherein the instructions are further executable by the processor to cause the apparatus to:
  receive a downlink data message on the resources of the one or more additional carriers, wherein a format of the downlink data message is based at least in part on the capability of the wireless device.

37. The apparatus of claim 31, wherein the instructions are further executable by the processor to cause the apparatus to:
  transmit an uplink control message on the resources of the first carrier, wherein a format of the uplink control message is based at least in part on the capability of the wireless device.

38. The apparatus of claim 31, the instructions are further executable by the processor to cause the apparatus to:
  transmit an uplink control message or an uplink data message on the resources of the one or more additional carriers, wherein a format of the uplink control message or the uplink data message is based at least in part on the capability of the wireless device.

39. The apparatus of claim 31, wherein a bandwidth of each narrowband region comprises a bandwidth of twelve Long Term Evolution (LTE) subcarriers (1RB).

40. The apparatus of claim 31, wherein the instructions are further executable by the processor to cause the apparatus to:
  receive a system information broadcast message on the resources of the first carrier; and
  identify the different narrowband regions of the radio frequency spectrum band based at least in part on the system information broadcast message.

41. The apparatus of claim 31, wherein the instructions are further executable by the processor to cause the apparatus to:
  perform a random access procedure using resources of the first carrier, wherein the configuration message is received during the random access procedure.

42. The apparatus of claim 31, wherein the instructions are further executable by the processor to cause the apparatus to:
  receive one or more synchronization signals on the resources of the first carrier.

43. The apparatus of claim 42, wherein the instructions are further executable by the processor to cause the apparatus to:
  identify a location of the first narrowband region of the radio frequency spectrum band based at least in part on the one or more synchronization signals.

44. The apparatus of claim 42, wherein the instructions are further executable by the processor to cause the apparatus to:
  determine that a base station has gained access to the first narrowband region and the different narrowband regions of the radio frequency spectrum band based at least in part on receiving the one or more synchronization signals; and
  tune one or more radio frequency (RF) chains to frequencies of the different narrowband regions based at least in part on determining that the base station gained access to the first narrowband region and the different narrowband regions.

45. The apparatus of claim 44, wherein the instructions are further executable by the processor to cause the apparatus to:
  monitor for the one or more synchronization signals while operating in a radio resource control (RRC) idle mode.

46. The apparatus of claim 42, wherein the one or more synchronization signals comprise a primary synchronization signal (PSS) and a secondary synchronization signal (SSS).

47. An apparatus for wireless communication, in a system comprising:
  a processor;
  memory in electronic communication with the processor; and
  instructions stored in the memory and operable, when executed by the processor, to cause the apparatus to:
    receiving an indication of a capability of a first wireless device on resources of a first carrier in a first narrow band region of a radio frequency spectrum band;
    transmit a configuration message on the resources of the first carrier to the first wireless device, wherein the configuration message identifies a configuration of a first set of additional carriers that are in a different narrowband regions of the radio frequency spectrum band and wherein the configuration of the first set of additional carriers is based at least in part on the capability of the first wireless device;
    transmit, on the resources of the first carrier to the first wireless device, an assignment of resources on the first set of additional carriers in the different narrowband regions of the radio frequency spectrum band; and
    communicate with the first wireless device on the first set of additional carriers in the different narrowband regions of the radio frequency spectrum band according to the assignment.

48. The apparatus of claim 47, wherein the instructions are further executable by the processor to cause the apparatus to:
transmit an additional configuration message on the first carrier in the first narrowband region of the radio frequency spectrum band to a second wireless device, wherein the additional configuration message identifies a configuration of a second set of additional carriers that are in the different narrowband regions.

49. The apparatus of claim 47, wherein each carrier of the first set of additional carriers is contiguous to another carrier of the first set of additional carriers.

50. The apparatus of claim 47, wherein the instructions are further executable by the processor to cause the apparatus to:
receive an uplink message from the first wireless device on the resources of the first carrier in the first narrowband region.

51. The apparatus of claim 47, wherein a number of carriers in the first set of additional carriers in the configuration is based at least in part on the capability of the first wireless device.

52. The apparatus of claim 47, wherein the instructions are further executable by the processor to cause the apparatus to:
transmit a downlink control message having a format that is based at least in part on the capability of the first wireless device.

53. The apparatus of claim 47, wherein the instructions are further executable by the processor to cause the apparatus to:
transmit a downlink data message on the resources of the first set of additional carriers, wherein a format of the downlink data message is based at least in part on the capability of the first wireless device.

54. The apparatus of claim 47, wherein the instructions are further executable by the processor to cause the apparatus to:
receive an uplink control message on the resources of the first carrier, wherein a format of the uplink control message is based at least in part on the capability of the first wireless device.

55. The apparatus of claim 47, wherein the instructions are further executable by the processor to cause the apparatus to:
receive an uplink control message or an uplink data message on the resources of the first set of additional carriers, wherein a format of the uplink control message or the uplink data message is based at least in part on the capability of the first wireless device.

56. The apparatus of claim 47, wherein the instructions are further executable by the processor to cause the apparatus to:
transmit a system information broadcast message on the resources of the first carrier, wherein the system information broadcast message identifies the different narrowband regions of the radio frequency spectrum band.

57. The apparatus of claim 47, wherein the instructions are further executable by the processor to cause the apparatus to:
perform a random access procedure with the first wireless device using resources of the first carrier, wherein the configuration message is transmitted during the random access procedure.

58. The apparatus of claim 47, wherein the instructions are further executable by the processor to cause the apparatus to:
transmit one or more synchronization signals on the resources of the first carrier.

59. A non-transitory computer readable medium storing code for wireless communication, the code comprising instructions executable to:
transmit an indication of a capability of a wireless device on resources of a first carrier in a first narrowband region of a radio frequency spectrum band;
receive a configuration message on the resources of the first carrier;
identify, based at least in part on the configuration message, a configuration of one or more additional carriers that are in a different narrowband regions of the radio frequency spectrum band, wherein the configuration of the one or more additional carriers is based at least in part on the capability of the wireless device;
receive, on the resources of the first carrier, an assignment of resources on the one or more additional carriers in the different narrowband regions of the radio frequency spectrum band; and
communicate on the one or more additional carriers in the different narrowband regions of the radio frequency spectrum band according to the assignment.

60. A non-transitory computer readable medium storing code for wireless communication, the code comprising instructions executable to:
receive an indication of a capability of a first wireless device on resources of a first carrier in a first narrow band region of a radio frequency spectrum band;
transmit a configuration message on the resources of the first carrier to the first wireless device, wherein the configuration message identifies a configuration of a first set of additional carriers that are in a different narrowband regions of the radio frequency spectrum band and wherein the configuration of the first set of additional carriers is based at least in part on the capability of the first wireless device;
transmit, on the resources of the first carrier to the first wireless device, an assignment of resources on the first set of additional carriers in the different narrowband regions of the radio frequency spectrum band; and
communicate with the first wireless device on the first set of additional carriers in the different narrowband regions of the radio frequency spectrum band according to the assignment.

* * * * *